(12) United States Patent
Laroia et al.

(10) Patent No.: US 8,189,491 B2
(45) Date of Patent: May 29, 2012

(54) APPARATUS AND METHOD OF GENERATING AND MAINTAINING NON-ORTHOGONAL CONNECTION IDENTIFICATIONS (CIDS) FOR WIRELESS PEER-TO-PEER NETWORKS

(75) Inventors: Rajiv Laroia, Far Hills, NJ (US); Saurabh Tavildar, Jersey City, NJ (US); Xinzhou Wu, Monmouth Junction, NJ (US); Junyi Li, Bedminster, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 1005 days.

(21) Appl. No.: 12/146,939

(22) Filed: Jun. 26, 2008

(65) Prior Publication Data
US 2009/0016315 A1    Jan. 15, 2009

Related U.S. Application Data

(60) Provisional application No. 60/948,885, filed on Jul. 10, 2007.

(51) Int. Cl.
*H04J 1/16* (2006.01)
*H04L 12/56* (2006.01)

(52) U.S. Cl. ......... 370/252; 370/230; 370/328; 370/389

(58) Field of Classification Search ................... 370/252, 370/230, 328, 389
See application file for complete search history.

(56) References Cited

U.S. PATENT DOCUMENTS

| 7,539,507 | B2 | 5/2009 | Grob et al. |
| 2005/0047383 | A1 | 3/2005 | Yoshida |
| 2008/0037487 | A1* | 2/2008 | Li et al. ............... 370/338 |
| 2008/0112334 | A1* | 5/2008 | Laroia et al. ........... 370/254 |
| 2009/0016272 | A1* | 1/2009 | Li et al. ............... 370/328 |
| 2009/0019165 | A1* | 1/2009 | Li et al. ............... 709/227 |

FOREIGN PATENT DOCUMENTS
EP          1367783        12/2003

OTHER PUBLICATIONS

Bahl P et al: "SSCH: Slotted Seeded Channel Hopping for Capacity Improvement in IEEE 802.11 Ad-Hoc Wireless Networks" Proceedings of the 10TH. Annual International Conference on Mobile Computing and Networking. MOBICOM 2004. Phladelphia, PA, Sep. 26-Oct. 1, 2004. [Annual International Conference on Mobile Computing and Networking], New York, NY: ACM; US. vol. CONF. 10, Oct. 26, 2008, pp. 216-230. XP001235034.
International Search Report—PCT/US2008/068931 International Search Authority—European Patent Office—Nov. 21, 2008.
Written Opinion—PCT/US2008/068931, International Search Authority—European Patent Office—Nov. 21, 2008.

* cited by examiner

*Primary Examiner* — John Pezzlo
(74) *Attorney, Agent, or Firm* — Peng Zhu; Paul S. Holdaway

(57) ABSTRACT

Apparatus and method are provided for generating transmission connection identifiers (CIDs) in a non-orthogonal or pseudo-random manner identifying peer-to-peer connections in a wireless communication network. When a transmitter terminal intends to transmit to its peer receiver terminal, it just picks a transmission CID in a pseudo-random manner, without trying to avoid a similar transmission CID in a neighborhood. The method of generating this pseudo-random transmission CID may be agreed to between the transmitter and its intended receiver beforehand, for example, during the paging cycle. Also, the mapping between the transmission CID and a set of tone/symbols may not necessarily be orthogonal. In one embodiment, the transmission CID may also change over time in a pseudo-random fashion which is different between different transmitter/receiver pairs. With this property, two transmitter/receiver (Tx/Rx) pairs are not likely to use the same transmission CID for consecutive time intervals.

35 Claims, 14 Drawing Sheets

APPARATUS AND METHOD OF GENERATING AND MAINTAINING NON-ORTHOGONAL CONNECTION IDENTIFICATIONS (CIDS) FOR WIRELESS PEER-TO-PEER NETWORKS

CLAIM OF PRIORITY UNDER 35 U.S.C. §119

The present Application for Patent claims priority to U.S. Provisional Application No. 60/948,885 entitled "Apparatus and Method of Generating and Maintaining Non-Orthogonal Transmission Identifications (IDs) for Wireless Peer-To-Peer Networks" filed Jul. 10, 2007, and assigned to the assignee hereof and hereby expressly incorporated by reference herein.

BACKGROUND

1. Field

The following description generally relates to wireless communications and, in particular, generating and maintaining pseudo-random or non-orthogonal transmission IDs in a wireless network where both ad hoc and local access point (AP) communications coexist.

2. Background

Wireless communication systems are widely deployed to provide various types of communication; for instance, voice and/or data may be provided via such wireless communication systems. A typical wireless communication system, or network, can provide multiple users access to one or more shared resources. For instance, a system may use a variety of multiple access techniques such as Frequency Division Multiplexing (FDM), Time Division Multiplexing (OFDM), and others.

Common wireless communication systems employ one or more base stations that provide a coverage area. A typical base station can transmit multiple data streams for broadcast, multicast and/or unicast services, wherein a data stream may be a stream of data that can be of independent reception interest to a wireless terminal. A wireless terminal within the coverage area of such base station can be employed to receive one, more than one, or all the data streams carried by the composite stream. Likewise, a wireless terminal can transmit data to the base station or another wireless terminal.

Wireless communication systems leverage various portions of wireless spectrum for transferring data. However, wireless spectrum is an expensive and valuable resource. For example, significant costs may be incurred by a company desiring to operate a wireless communication system over a portion of the wireless spectrum (e.g., within the licensed spectrum). Further, conventional techniques typically provide inefficient utilization of wireless spectrum. According to a common illustration, the spectrum allocated for wide area network cellular communication oftentimes is not uniformly utilized across time and space; thus a significant subset of spectrum may be unused in a given geographic location in a given time interval.

According to another example, wireless communication systems often times employ peer-to-peer or ad hoc architectures whereby a wireless terminal may transfer signals directly to another wireless terminal. As such, signals need not traverse through a base station; rather, wireless terminals within range of each other may discover and/or communicate directly. However, conventional peer-to-peer networks typically operate in an asynchronous manner whereby peers may effectuate differing tasks at a particular time. Consequently, peers may encounter difficulty associated with identifying and/or communicating with disparate peers within range, power may be inefficiently utilized, and so forth.

Therefore, a way is needed to allocate and or maintain peer identifiers within peer-to-peer communication networks that utilize a share frequency spectrum.

SUMMARY

The following presents a simplified summary of one or more embodiments in order to provide a basic understanding of some embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

A first device may be configured to generate and/or utilize a connection identifier for a peer-to-peer communication connection between the first device and a second device in a wireless communications network. The first device may determine the connection identifier as a function of a first identifier of the first device and a second identifier of the second device. The first device may also obtain a value of a time counter. Traffic data may then be transmitted from the first device to the second device in a traffic channel slot as a function of the connection identifier and the value of the time counter. A broadcast signal may be received by the first device from a common network timing source, where the value of the time counter is determined as a function of the received broadcast signal and the second device receives the broadcast signal from the common network timing source.

Prior to determining the connection identifier, the first device may send the first identifier of the first device to the second device in a paging request message. The first device may also receive the second identifier of the second device from the second device in a paging response message. The first device identifier and second device identifiers may then be used to determine the connection identifier. In one example, the first and second device identifiers may be considered "long" identifiers (at least longer than the connection identifier).

Prior to transmitting traffic data, the first device may scramble the traffic data using a scrambling sequence, where the scrambling sequence may be derived from the connection identifier and the value of the time counter.

Prior to transmitting traffic data, the first device may also transmit a transmission request signal to the second device using a transmission resource unit, the transmission resource unit being a subset of tones in a subset of symbols within a traffic management channel slot corresponding to the traffic channel slot and the transmission resource unit being determined as a function of the connection identifier and the value of the time counter.

The traffic management channel slot may include a plurality of OFDM symbols, each OFDM symbol including a plurality of tones, and the transmission resource unit includes one tone in one of the plurality of symbols in the traffic management channel slot.

The first device may also receive traffic data from the second device in a traffic channel slot as a function of the connection identifier and the value of the time counter. Subsequent to receiving the traffic data from the second device, the first device may descramble it using a descrambling sequence derived from the connection identifier and the value of the time counter. Prior to receiving the traffic data from the second device, the first device may monitor a traffic management channel slot corresponding to the traffic channel slot to determine whether a transmission request signal is received from the second device in a transmission resource unit. The transmission resource unit may be a subset of tones in a subset of symbols within a traffic management channel slot corresponding to the traffic channel slot and the transmission resource unit may be determined as a function of the connection identifier and the value of the time counter.

The first device may establish yet another peer-to-peer communication connection with a third device. In doing so, the first device may determine a second connection identifier of the yet another connection as a function of the identifier of the first device and an identifier of the third device. A broadcast signal may be received by the first device from a common network timing source, wherein the value of the time counter is determined as a function of the received broadcast signal. The first device may then transmit traffic data to the third device in a traffic channel slot as a function of the second connection identifier and the value of the time counter.

The various features describe herein may be implemented within a wireless device, a circuit or processor incorporated in a wireless device, and/or a software.

BRIEF DESCRIPTION OF THE DRAWINGS

Various features, nature, and advantages may become apparent from the detailed description set forth below when taken in conjunction with the drawings in which like reference characters identify correspondingly throughout.

DETAILED DESCRIPTION

Figure 1:
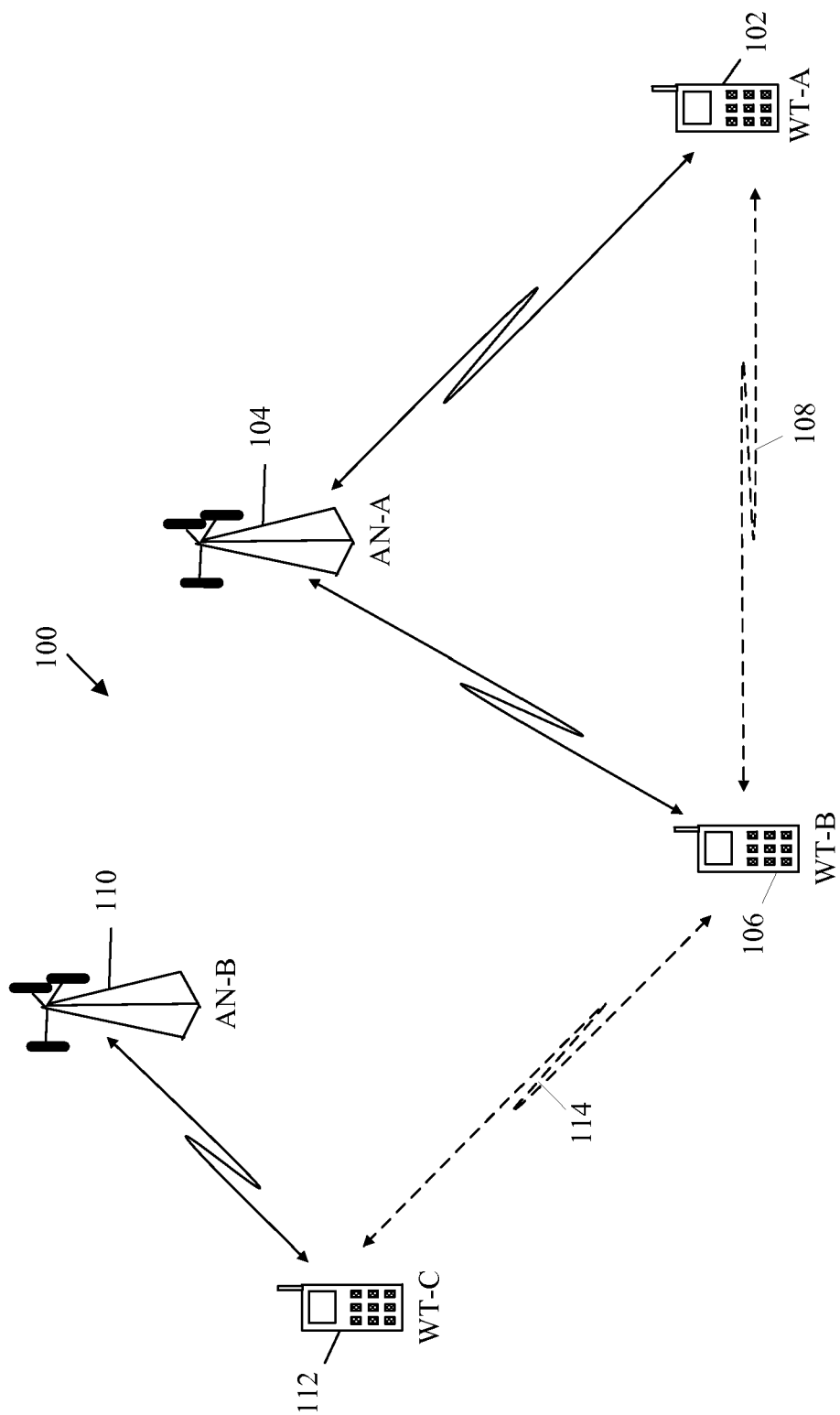
FIG. 1 is a block diagram illustrating the how an ad hoc peer-to-peer network may be implemented within the same frequency spectrum as a wide area network.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

Overview

In one embodiment, an apparatus and method are disclosed for generating a transmission connection identifier (CID) for a transmitter/receiver pair in a wireless network by generating a non-orthogonal (random or pseudo-random) transmission CID for the transmitter/receiver pair, and signaling a transmission intention of the transmitter. When a transmitter wants to start a conversation with a certain neighboring receiver node, the transmitter and receiver nodes pseudo-randomly generate a transmission CID which can be used to identify their connection within a traffic channel in a shared frequency space. This transmission CID may be used during a time slot or interval to facilitate communications from the first device to the second device. The transmission CID may be changed every time interval or slot so that, if a CID collision occurs with another connection for other devices, the interference is limited to just that time interval or slot.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

Ad Hoc Communication System

An ad hoc peer-to-peer wireless network may be established among two or more terminals without intervention of a centralized network controller. In some examples, the wireless network may operate within a frequency spectrum shared among a plurality of wireless terminals.

FIG. 1 is a block diagram illustrating the how an ad hoc peer-to-peer network may be implemented, e.g., in conjunction a wide area network. In some examples, the peer-to-peer network and the wide area network may share the same frequency spectrum. In other examples, the peer-to-peer network is operated at a different frequency spectrum, e.g., a spectrum dedicated to the use of the peer-to-peer network. A communication system 100 may comprise one or more wireless terminals WT-A 102, WT-B 106, and WT-C 112. Although just three wireless terminals WT-A 102, WT-B 106, and WT-C 112 are depicted, it is to be appreciated that communication system 100 may include any number of wireless terminals. The wireless terminals WT-A 102, WT-B 106, and WT-C 112 can be, for example, cellular phones, smart phones, laptops, handheld communication devices, handheld computing devices, satellite radios, global positioning systems, PDAs, and/or any other suitable device for communicating over wireless communication system 100.

According to one example, the communication system 100 may support a wide area network (WAN) which may include one or more access nodes AN-A 104 and AN-B 110 (e.g., base station, access point, etc.) and/or any number of disparate access nodes (not shown) in one or more sectors/cells/regions that receive, transmit, repeat, etc., wireless communication signals to each other and/or to the one or more wireless terminals WT-A 102, WT-B 106, and WT-C 112. Each access node AN-A 104 and AN-B 110 may comprise a transmitter chain and a receiver chain, each of which can in turn comprise a plurality of components associated with signal transmission and reception (e.g., processors, modulators, multiplexers, demodulators, demultiplexers, antennas, . . . ) as will be appreciated by one skilled in the art. According to an optional feature, when communicating through the WAN, the wireless terminal(s) may transmit signals to and/or receive signals from an access node when communicating via the wide area infra-structure network supported by the communication system 100. For instance, wireless terminals WT-A 102 and WT-B 106 may communicate with the network via access node AN-A 104 while wireless terminal WT-C 112 may communication with a different access node AN-B 110.

The wireless terminals may also communicate directly with each other via a local area peer-to-peer (P2P) network (e.g., ad hoc network). Peer-to-peer communications may be effectuated by directly transferring signals between wireless terminals. Thus, the signals need not traverse through an access node (e.g., a base station) or centrally managed network. The peer-to-peer network may provide short range, high data rate communication (e.g., within a home, office, etc. type setting). For example, wireless terminals WT-A 102 and WT-B 106 may establish a first peer-to-peer network 108 and wireless terminals WT-B 106 and WT-C 112 may also establish a second peer-to-peer network 114.

Additionally, each peer-to-peer network connection 108 and 114 may include wireless terminals within a similar geographic area (e.g., within range of one another). However, it is to be appreciated that wireless terminals need not be associated with the same sector and/or cell to be included in a common peer-to-peer network. Further, peer-to-peer networks may overlap such that one peer-to-peer network may take place within a region that overlaps or is encompassed with another larger peer-to-peer network. Additionally, a wireless terminal may not be supported by a peer-to-peer network. Wireless terminals may employ the wide area network and/or the peer-to-peer network where such networks overlap (e.g., concurrently or serially). Moreover, wireless terminals may seamlessly switch or concurrently leverage such networks. Accordingly, wireless terminals whether transmitting and/or receiving may selectively employ one or more of the networks to optimize communications.

Peer-to-peer communications between the wireless terminals may be synchronous. For example, wireless terminals WT-A 102 and WT-B 106 may utilize a common clock reference to synchronize performance of distinct functions. The wireless terminals WT-A 102 and WT-B 106 may obtain timing signals from the access node AN-A 104. The wireless terminals WT-A 102 and WT-B 106 may also obtain timing signals from other sources, for instance, GPS satellites or television broadcast stations. According to an example, time may be meaningfully partitioned in a peer-to-peer network for functions such as peer discovery, paging, and traffic. Further, it is contemplated that each peer-to-peer network may set its own time.

Before communication of traffic in a peer-to-peer connection can take place, the two peer wireless terminals may detect and identity each other. The process by which this mutual detection and identification between peers takes place may be referred to as peer discovery. The communication system 100 may support peer discovery by providing that peers, desiring to establish peer-to-peer communications, periodically transmit short messages and listen to the transmissions of others. For example, the wireless terminals WT-A 102 (e.g., transmitting wireless terminal) may periodically broadcast or send signals to the other wireless terminal(s) WT-B 106 (e.g., receiving wireless terminal(s)). This allows the receiving wireless terminal WT-B 106 to identify the sending wireless terminal WT-A 102 when the receiving wireless terminal WT-B 106 is in vicinity of the sending wireless terminal WT-A 102. After identification, an active peer-to-peer connection 108 may be established.

Transmissions for peer discovery may periodically occur during specified times referred to as peer discovery intervals, the timing of which may be predetermined by a protocol and known to the wireless terminals WT-A 102 and WT-B 106. Wireless terminals WT-A 102 and WT-B 106 may each transmit respective signals to identify themselves. For example, each wireless terminal WT-A 102 and WT-B 106 may send a signal during a portion of a peer discovery interval. Further, each wireless terminal WT-A 102 and WT-B 106 may monitor signals potentially transmitted by other wireless terminals in a remainder of the peer discovery interval. According to an example, the signal may be a beacon signal. By way of another illustration, the peer discovery interval may include a number of symbols (e.g., OFDM symbols). Each wireless terminal WT-A 102 may select at least one symbol in the peer discovery interval for transmission by that wireless terminal WT-A 102. Moreover, each wireless terminal WT-A 102 may transmit a corresponding signal in one tone in the symbol selected by that wireless terminal WT-A 102.

The local area peer-to-peer network and the wide area network may share a common wireless spectrum to effectuate communication; thus, bandwidth may be shared for transferring data via the disparate types of networks. For example, the peer-to-peer network and the wide area network may both communicate over the licensed spectrum. However, the peer-to-peer communication need not utilize the wide area network infrastructure.

After wireless terminals discover each other, they may proceed to establish connections. In some examples, a connection links two wireless terminals, e.g., in FIG. 1 connection 108 links wireless terminals WT-A and WT-B. Terminal WT-A 102 can then transmit traffic to terminal WT-B 106 using connection 108. Terminal WT-B 106 can also transmit traffic to terminal WT-A 102 using connection 108.

Figure 2:
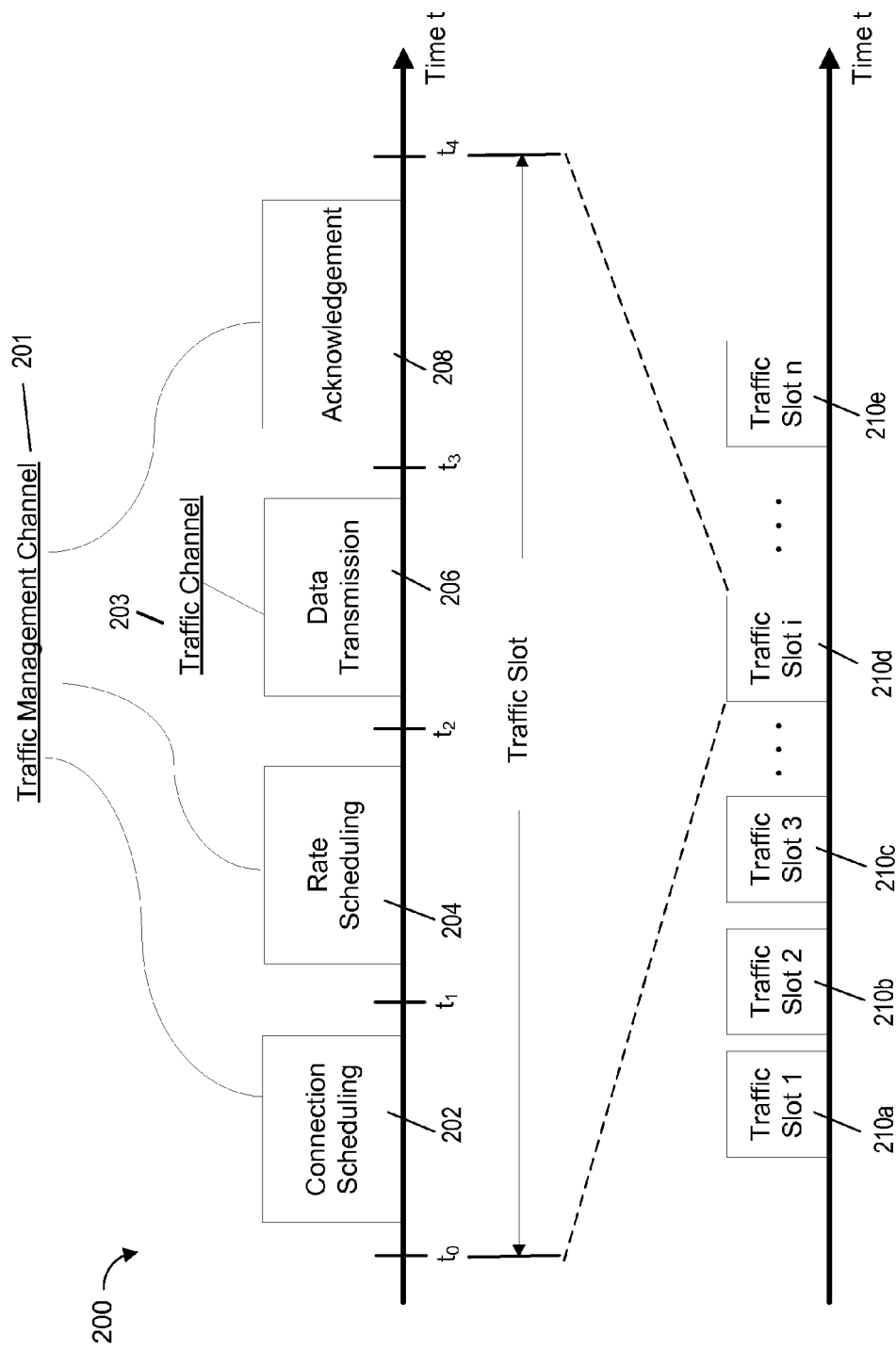
FIG. 2 illustrates one example of a timing sequence of a traffic management channel and a traffic channel that may be used by wireless terminals to transport traffic after a peer-to-peer communication connection has been established between wireless terminals.

FIG. 2 illustrates one example of a timing sequence for a traffic channel slot that may be used by wireless terminals to transport traffic after a peer-to-peer communication connection has been established between wireless terminals. Each traffic channel slot 210 may include a traffic management channel 201 and a traffic channel 203. The traffic management channel 201 may be used for signaling related to traffic data transmissions in the traffic channel 206. A connection scheduling segment 202, a rate scheduling segment 204, and an acknowledgment segment 208 are collectively referred to as the traffic management channel 201. A data transmission segment 206 may be referred to as the traffic channel 203. The connection scheduling segment 202, the rate scheduling segment 204, the data segment 206 and the acknowledgment 208 shown in FIG. 2 comprise a traffic slot.

The connection scheduling segment 202 may be used by a transmitter terminal to indicate to its receiver terminal (in a peer-to-peer connection) to indicate that it is ready to transmit traffic data. The rate scheduling segment 204 allows the transmitter/receiver terminals (in the peer-to-peer connection) to obtain a transmission rate and/or power to use in transmitting the traffic data. The data transmission segment 206 is then used to transmit the desired traffic data at the obtained transmission rate and/or power. The acknowledgement segment 208 may be used by the receiver terminal to indicate that the traffic data was received or not received in the data transmission segment 206. In one example, the time duration of a traffic slot is approximately two (2) milliseconds. As the traffic slots 210 repeat over time, the time sequence structure shown in FIG. 2 shows one period of the traffic slots. Note that, prior to sending traffic data in the traffic slot 210, the transmitter and receiver terminals may have established a peer-to-peer connection via a control slot 404 (in FIG. 4).

Collision Mitigation Using Transmission CIDs

In an ad hoc peer-to-peer communication system, multiple communications may take place using frequency spectrum resources shared in both space and time. Because of the distributed nature of the ad hoc peer-to-peer network, it may not always be possible to control the channel allocations (e.g., slots) used for transmissions between the wireless terminals. In wireless networks where a central authority does not exist, interference avoidance and/or management is a key feature to maintain the efficiency of the network performance.

Figure 3:
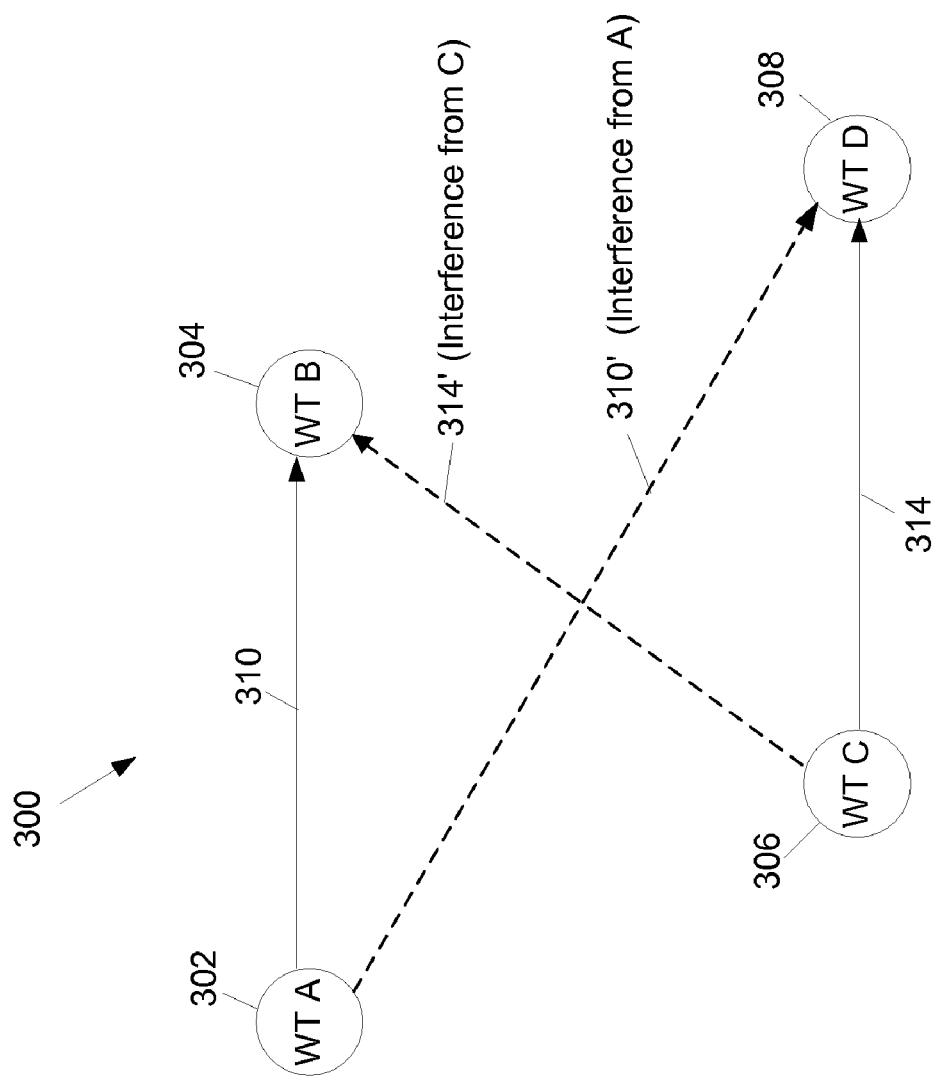
FIG. 3 is a block diagram illustrating an environment in which a plurality of wireless terminals may establish peer-to-peer communication links that may cause interference to other nearby wireless terminals.

FIG. 3 is a block diagram illustrating an environment in which a plurality of wireless terminals may establish peer-to-peer communication connections that may cause interference to other nearby wireless terminals. A peer-to-peer network 300 may include a plurality of wireless terminals that may share and/or concurrently use a frequency spectrum. The shared frequency spectrum may include one or more transmission and/or control channels, with each transmission (traffic) channel having a corresponding traffic management channel. In one example, the traffic management channel may be used to send a traffic request for communications over a corresponding transmission (traffic) channel.

In one example, a first wireless terminal WT A 302 may be attempting to transmit 310 to a second wireless terminal WT B 304 while a third wireless terminal WT C 306 is concurrently attempting to transmit 314 to a fourth wireless terminal WT D 308 using the same traffic channel bandwidth resource. The first wireless terminal WT A 302 may be referred to as the intended transmitter, the second wireless terminal WT B 304 may be referred to as the intended receiver, and the third wireless terminal WT C 306 may be considered the interferer. In this peer-to-peer network 300, a transmission and/or management channel pair may be shared by the plurality of the wireless terminals WT A, WT B, WT C, and WT D. However, because such transmission (traffic) channel is shared (e.g., frequency spectrum sharing) by the wireless terminals, it may also result in unwanted interference 314' and 310' among the wireless terminals. For instance, if both transmissions 310 and 314 actually take place, then the signal 314' from the third wireless terminal WT C 306 may be seen as interference to the second wireless terminal WT B 304 receiver and may degrade its ability to successfully recover the desired signal 310 from the first wireless terminal WT A 302. Therefore, certain interference management protocol is needed to manage interference from the third wireless terminal WT C 306 to the second wireless terminal WT B 304. One goal of the interference management protocol is to allow the third wireless terminal WT C 306 to transmit without creating excessive interference to the second wireless terminal WT B 304, thereby increasing the overall throughput and improving the system performance. Note that in the meantime, the first wireless terminal WT A 302 may also cause interference 310' to the fourth wireless terminal WT D 308, and a similar interference management protocol may also be used to control that interference.

Because there is no centralized traffic management authority, there is a chance that WT A 302 and WT C 306 may transmit on the same or overlapping channel, thereby causing interference with each other. For example, by coincidence, both WT A 302 and WT C 306 may use the same transmission CID. A transmission CID may be used to indicate a particular transmission channel (e.g., frequency or time slot) to a receiving terminal WT B 304 and 308. Consequently, when the same transmission CID is used by two terminals, they may also be concurrently transmitting on the same channel or overlapping channels. If both transmitting terminals WT A 302 and WT C 306 are within range of the receiver terminals WT B 304 and/or WT D 308, then the receiver terminals WT B 304 and/or WT D 308 may perceive interference.

In particular, a way is needed that allows multiple wireless terminals to choose channels within shared frequency the without distinguish between transmissions from an intended peer and those from an unintended peer.

Channel Architecture

Figure 4:
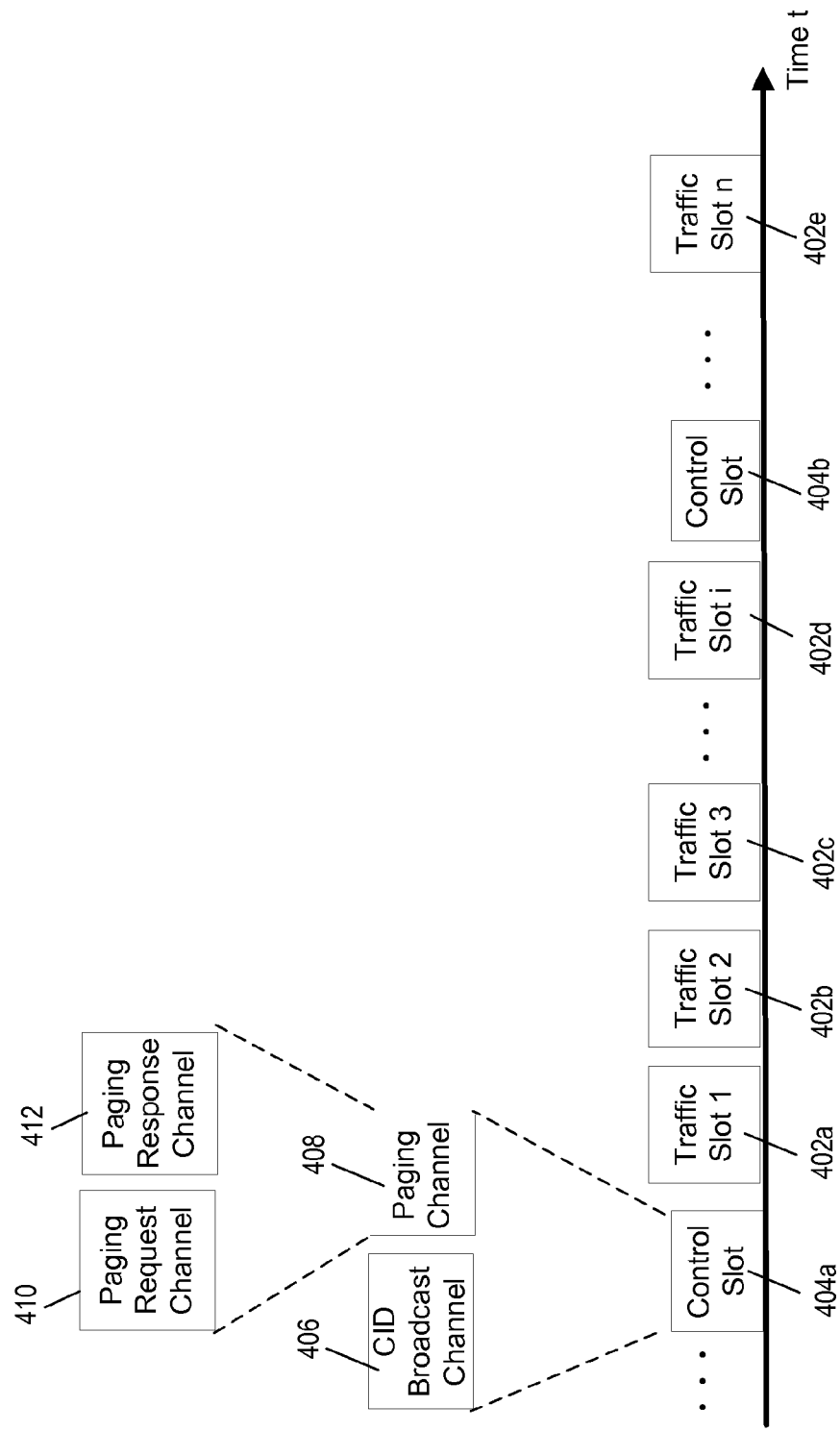
FIG. 4 illustrates one example of a channel architecture in which a control slot in inserted every so often between traffic slots.

FIG. 4 illustrates one example of a channel architecture in which a control slot in inserted every so often between traffic slots. Traffic slots 402 are time intervals during which a transmitter terminal may send peer-to-peer traffic data to a receiver terminal through the transmission channel. In one example, each traffic slot 402 may be as illustrated in FIG. 2. Each traffic slot may be 2 milliseconds (ms) long. A traffic slot 402 may include a traffic channel portion in which data traffic is transmitted and a traffic management channel portion in which scheduling and interference management takes place.

The transmission channel may also include a control channel comprising a plurality of control slots 404. A control slot 404 may serve to establish and maintain a peer-to-peer connection between the transmitter and receiver terminals. Each control slot 404 may include an optional CID Broadcast Channel 406 and a Paging Channel 408. The CID Broadcast Channel 406 may be used to indicate those peer-to-peer connection identifiers (CIDs) that are in use by nearby connections and to indicate whether a peer-to-peer connection is still alive. For example, the transmitter and receiver terminals may monitor the CID Broadcast Channel 406 to determine which CIDs are in use. The Paging Channel 408 is used by the transmitter and receiver terminals to establish new CIDs for a new peer-to-peer connection. The control slots 404 may occur at much longer intervals than traffic slots 402. For instance, the control slots 404 may occur every second or so.

The paging channel 408 may include a paging request channel 410 and a paging response channel 412. A paging initiator (e.g., a transmitter terminal WT A) sends a paging request to a paging target (e.g., a receiver terminal WT B) in the paging request channel 410. The paging target then sends a paging response back to the paging initiator in the paging response channel 412. One purpose of the paging request and response exchange is to establish a connection between the paging initiator and paging target. The paging initiator and target select a connection ID (CID) to be used by the two terminals in the subsequent traffic slots for exchanging other control and/or traffic data.

Figure 5:
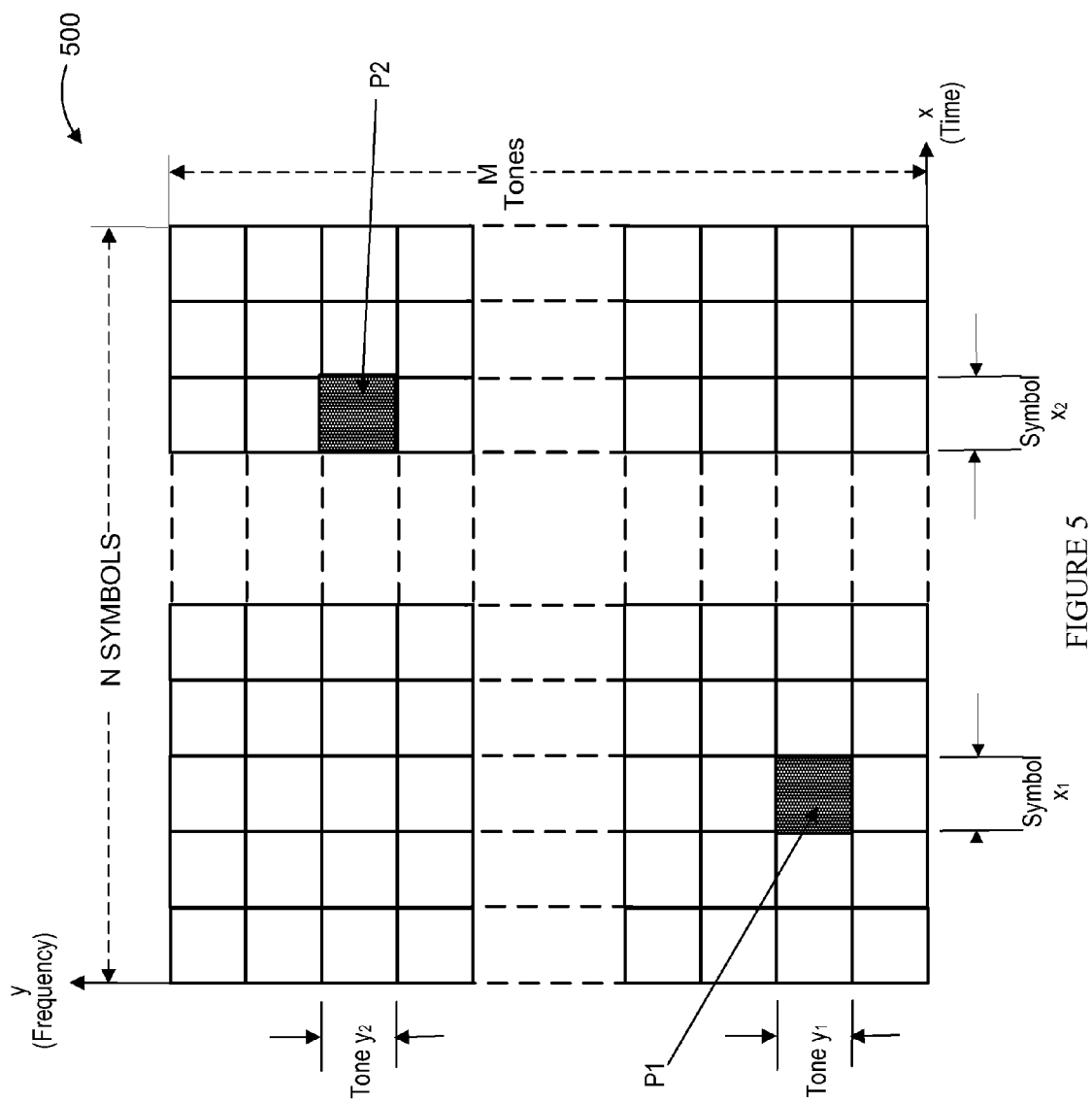
FIG. 5 illustrates an example time-frequency grid associated with a signal transmission.

FIG. 5 illustrates an example time-frequency grid 500 associated with a signal transmission. The exemplary signal may be an OFDM signal. The time-frequency grid 500 is the resource available for transmitting and/or receiving signals over a peer-to-peer network, e.g., during a control slot (e.g., control slot 404 in FIG. 4) and/or traffic channel slot (traffic slot 210 in FIG. 2 within traffic management channel 201). The x-axis represents time and may include N symbols (e.g., where N may be any integer), and the y-axis represents frequency and may include M tones (e.g., where M may be any integer).

A transmitter and/or receiver terminal may use the time-frequency grid 500 in the traffic management channel. For instance, the time-frequency grid may be considered a CID resource space from which a terminal may select a CID resource unit corresponding to a CID. For example, in a traffic slot, a transmitter terminal may select a CID resource unit to signal a transmission request to the corresponding receiver terminal of the connection associated with the CID. Similarly, the receiver terminal may select a CID resource unit to signal a request response to the transmitter terminal. The CID resource units available for the transmitter terminal and for the receiver terminal may be partitioned a priori in a fixed manner so that the transmitter terminal selects a CID resource unit in a fixed subset of the total time-frequency grid of the traffic management channel, while the receiver terminal selects a CID resource unit in a different fixed subset of the total time-frequency grid of the traffic management channel. Such CID resource space may be transmitted, for example, in a control slot 404 (in FIG. 4) and/or traffic slot 210 (in FIG. 2 within traffic management channel 201).

A CID resource unit may be defined by a time-frequency combination or symbol-tone combination. According to an example, a terminal may select a particular symbol (e.g., transmission time) for transmission based upon an identifier of the wireless terminal or a user who is utilizing the wireless terminal and/or a time variable (e.g., time counter) that may be commonly understood within a peer-to-peer network to identify the current control slot interval. Further, a particular tone corresponding to the selected symbol may be determined (e.g., based upon the identifier and/or time variable). Pursuant to a further example, a hash function of the identifier and the time variable may yield the selected symbol position and/or tone position. For example, for a given connection, when the time variable takes a first value, the hash function may yield symbol $x_1$ and tone $y_1$ such that the wireless terminal transmits a single-tone signal $P_1$ as shown in FIG. 5 as the CID resource unit. When the time variable takes a second value, the hash function may yield symbol $x_2$ and tone $y_2$ such that the wireless terminal transmits a single-tone signal $P_2$ as shown in FIG. 5 as the CID resource unit.

Random (Non-Orthogonal) Peer-to-Peer Transmission CID Generation

A method is provided for generating transmission CIDs in a non-orthogonal or pseudo-random manner. When a transmitter terminal intends to transmit to its peer receiver terminal, it just picks a transmission CID in a pseudo-random manner, without trying to avoid a similar transmission CID in a neighborhood. The method of generating this pseudo-random transmission CID may be agreed to between the transmitter and its intended receiver beforehand, for example, during the paging cycle. Also, the mapping between the transmission CID and a set of tone/symbols may not necessarily be orthogonal. In one embodiment, the transmission CID may also change over time in a pseudo-random fashion which is different between different transmitter/receiver pairs. With this property, two transmitter/receiver (Tx/Rx) pairs are not likely to use the same transmission CID for consecutive time intervals.

The concept of randomized transmission CIDs may enable an interference avoidance protocol. In each time interval or slot, each Tx/Rx pair may choose a pseudo-random transmission CID in a given CID space and by signaling between the Tx/Rx pairs, each pair can compare the CIDs it sees and its own CID and uses the transmission CID as a priority token to decide whether or not to transmit in the current time interval or slot. In the next time interval or slot, all the pairs repeat the process and a set of new pseudo-random CIDs are generated such that the CID space can be shared among different Tx/Rx pairs in the communication system.

This pseudo-random generation of transmission CIDs is quite appealing due to its simplicity and robustness. However, it also has its shortcomings due to the possibility of collisions, in the sense that two Tx/Rx pairs might accidentally choose the same transmission CID. If that happens and the two pairs are within the reach of each other, it would bring confusion to both Tx/Rx pairs and its neighboring users. This problem becomes more severe when AR/AT communications are present in the system together with the ad hoc communication pairs.

In a first method, transmission CIDs may be generated in a non-orthogonal or pseudo-random manner. In a peer-to-peer network, when a transmitter terminal intends to transmit to its receiver terminal it just picks a transmission CID in a pseudo-random manner without trying to avoid a similar transmission CID in a neighborhood. New transmission CIDs may be pseudo-randomly generated at every cycle so that even if a collision occurs at a particular cycle it is unlikely to occur in other cycles. As used herein, a "non-orthogonal", "pseudo-random", and/or "random" CID refers to the fact that for any given traffic slot, CIDs are not necessarily checked for collision avoidance. Instead a CID is selected from a set of possible CIDs without regard as to whether it is in use by another connection.

Figure 6:
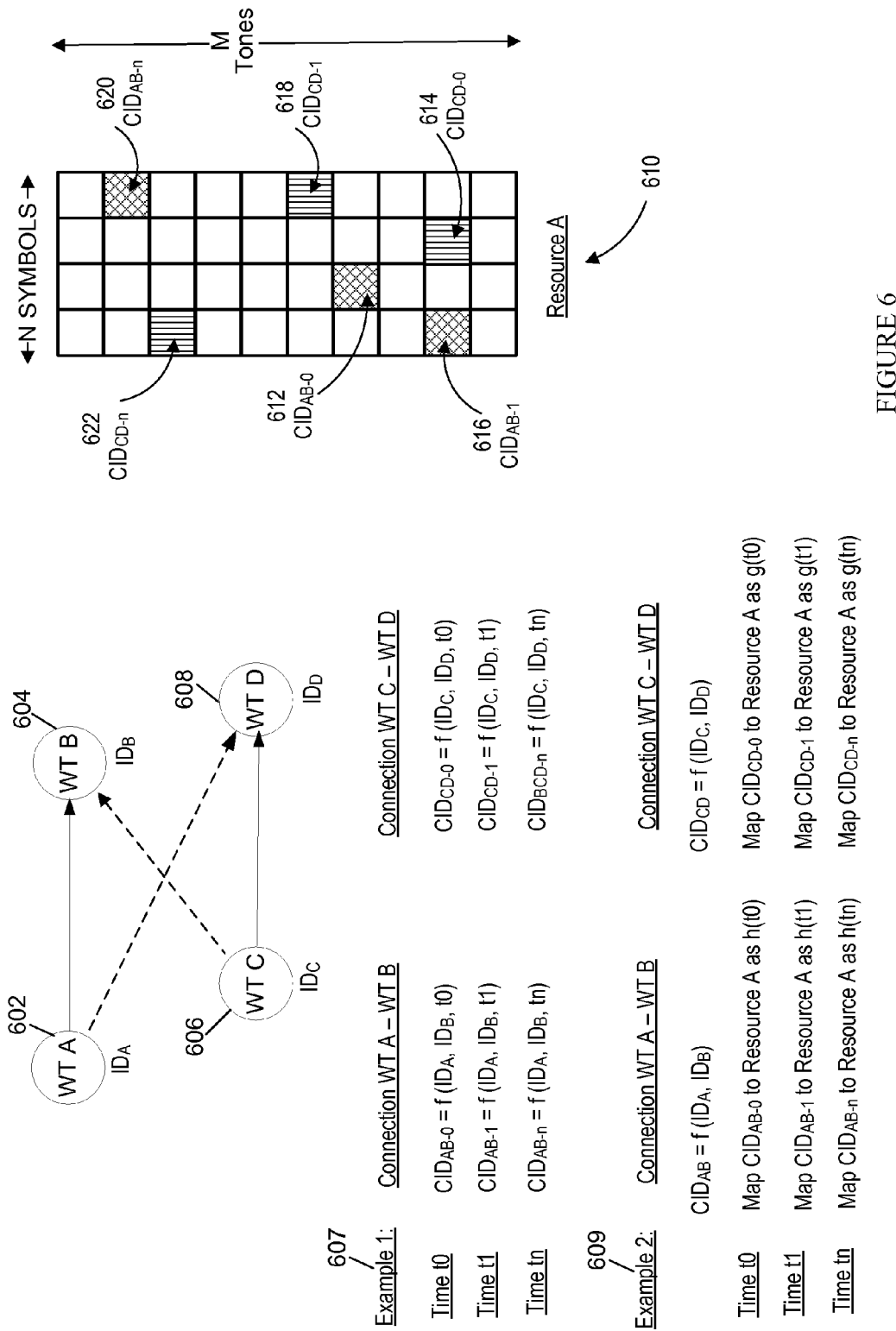
FIG. 6 is a block diagram illustrating how transmission CIDs may be pseudo-randomly selected between devices that maintain a peer-to-peer connection.

FIG. 6 is a block diagram illustrating how transmission (connection) IDs may be pseudo-randomly selected between devices that maintain a peer-to-peer connection. In this example, a first device WT A 602 attempts to establish a peer-to-peer connection with a second device WT B 604 and a third device WT C 606 attempts to establish a peer-to-peer connection with a fourth device WT D 608. Each device may have a unique device identifier IDi. For instance, the first device WT A 602 may be identified by a first identifier $ID_A$, the second device WT B 604 may be identified by a second identifier $ID_B$, the third device WT C 606 may be identified by a third identifier $ID_C$, and the fourth device WT D 608 may be identified by a fourth identifier $ID_D$. In this sense, the device identifiers may be "unique" if they are assigned from a very large number of possible identifiers such that the probability of two devices having the same identifier is small (e.g., less than one percent).

Transmission (connection) identifiers may be obtained as a function of the device identifiers for the Tx/Rx pair and a time varying value t, e.g., associated with the present traffic slot. Consequently, randomness or pseudo-randomness, is achieved by virtue of the unique combination of device identifiers and the time varying value t from one traffic slot to another.

According to a first example 607, for a first time interval, a first transmission $CID_{AB\text{-}0}$ for the peer-to-peer connection between devices WT A 602 and WT B 604 may be obtained as a function of $ID_A$, $ID_B$, and t0, where t0 is a value that changes from cycle to cycle (or time interval to time interval). Suppose that in the present traffic slot, device WT A 602 intends to transmit traffic to device WT B 604. In one embodiment, in the traffic management channel of the present traffic slot, device WT A 602 can use the symbol/tone combination corresponding to the first transmission $CID_{AB\text{-}0}$ to send a transmission request to device WT B 604. In another embodiment, device WT B 604 can use the symbol/tone combination corresponding to the first transmission $CID_{AB\text{-}0}$ to send a request response to device WT A 602. Similarly, for a second time interval, a second transmission $CID_{AB\text{-}1}$ may be obtained as a function of $ID_A$, $ID_B$, and t1. While at a third time interval, a third transmission $CID_{AB\text{-}n}$ may be obtained as a function of $ID_A$, $ID_B$, and tn. For a second Tx/Rx pair, WT C 606 and WT D 608, transmission identifiers $CID_{CD\text{-}0}$, $CD_{CD\text{-}1}$, and $CID_{CD\text{-}n}$ are similarly generated using the device identifiers $ID_C$, $ID_D$, and time varying value t. Note that not shown in the figure, in a given traffic slot, transmission $CID_{AB}$ may happen to be the same as transmission $CID_{CD}$, which is considered a CID collision event.

A transmission ID may be defined by a symbol/tone combination within transmission identifier resource or space 610. For a particular time interval, the transmission (connection) identifiers for a particular Tx/Rx device pair may be mapped into a transmission identifier resource or space 610 of symbols and tones as illustrated.

According to a second example 609, a first transmission $CID_{AB}$ may be obtained for the peer-to-peer connection between the first and second devices WT A 602 and WT B 604. A time varying value t may then be used at each time interval, cycle, or slot, to map the transmission identifier $CID_{AB}$ as a first function h of the time varying value. Consequently, for the different time periods t0, t1, and tn, the transmission identifier will be mapped to a different location of the transmission identifier resource or space 610. Similarly, a second transmission identifier $CID_{CD}$ may be computed by the third and fourth devices WT C 606 and WT D 608 which is then mapped to the resource 610 as a second function g of the time varying value t. In various implementations, the time varying value t may be based on a clock or it may be a counter. Because the transmission connection identifiers $CID_{AB}$ and $CID_{CD}$ are likely to be different values (due to the fact that they are computed using the unique device identifiers), and different mapping functions h and g may be used to map the transmission (connection) identifiers $CID_{AB}$ and $CID_{CD}$, the chances of frequent collisions between the transmission (connection) identifiers $ID_{AB}$ and $ID_{CD}$ in the resource 610 are small.

Figure 7:
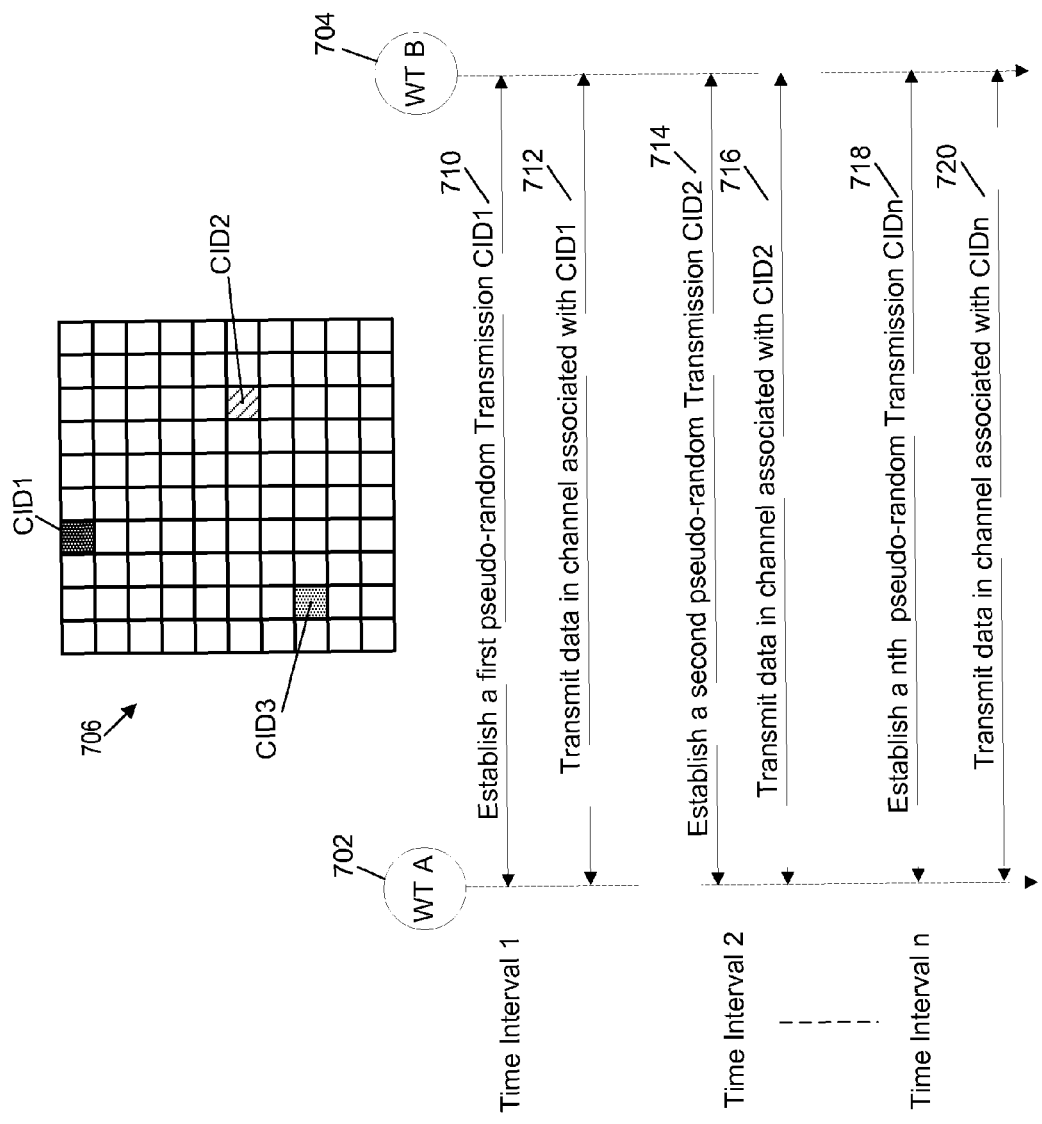
FIG. 7 is a flow diagram illustrating the use of random (non-orthogonal) transmission IDs within a peer-to-peer communication connection between two terminals.

FIG. 7 is a flow diagram illustrating the use of random (non-orthogonal) transmission IDs within a peer-to-peer communication connection between two terminals. In establishing a peer-to-peer communication connection, a first terminal WT A 702 and a second terminal WT B 704 may establish a first pseudo-random transmission CID1 710. In one example, the transmission CIDs may be generated in a non-orthogonal manner. For example, a transmission CID may be a function of device identifiers for the first terminal WT A 702 and/or second terminal WT B 704, and perhaps a time varying value. When the transmitter terminal WT A 702 intends to transmit to its receiver terminal WT B 704, it just picks a transmission CID in a pseudo-random manner without necessarily trying to avoid a similar transmission CID in a neighborhood. The method of generating the pseudo-random transmission CID may be agreed upon between the transmitter terminal and its intended receiver terminal beforehand (e.g., during the paging cycle). The selected transmission CID is mapped to a specific CID resource unit, e.g., a tone in an OFDM symbol in the traffic management channel, which can be used by WT A 702 or WT B 704 to signal traffic management information, e.g., transmission request or request response. In each cycle or time interval (e.g., a traffic slot), each Tx/Rx terminal pair may choose a new pseudo-random CID in a given CID space 706. In the next slot, cycle, or time interval, all the transmitter/receiver (Tx/Rx) pairs may repeat the process and a set of new pseudo-random CIDs (CID2 and CID3) may be generated 714 and 718. After establishing a transmission CID for a particular time interval, the transmitter terminal WT A 702 may transmit data on a channel associated with the particular transmission CID 712, 716, and 720 for that time interval.

In one example, the pseudo-random transmission CIDs may be generated within an ID space 706 in which each transmission CID is defined (or associated with) a particular tone/symbol combination or frequency-time combination that corresponds to a transmission channel. The use of the CID space may be non-orthogonal among different Tx/Rx terminal pairs. For example, in a traffic slot, Tx/Rx terminal pair (WT A and WT B) may select a CID, while a different Tx/Rx terminal pair (WT C and WT D, not shown in the figure) may select the same CID, thereby resulting in CID collision in that traffic slot. One feature provides that the transmission CID may change over time in a pseudo-random fashion which is different between different Tx/Rx pairs. That is, by virtue of using the device identifiers and perhaps a time varying value, pseudo-randomness may be achieved in generating transmission (connection identifiers) from one time interval to the next. With this feature, two Tx/Rx pairs are not likely to generate and use the same transmission CID for consecutive time intervals or slots. Therefore, even if a transmission CID collision occurs in a first time slot between two connections, the two connections are unlikely to generate the same transmission CIDs in the next time slot.

Figure 8:
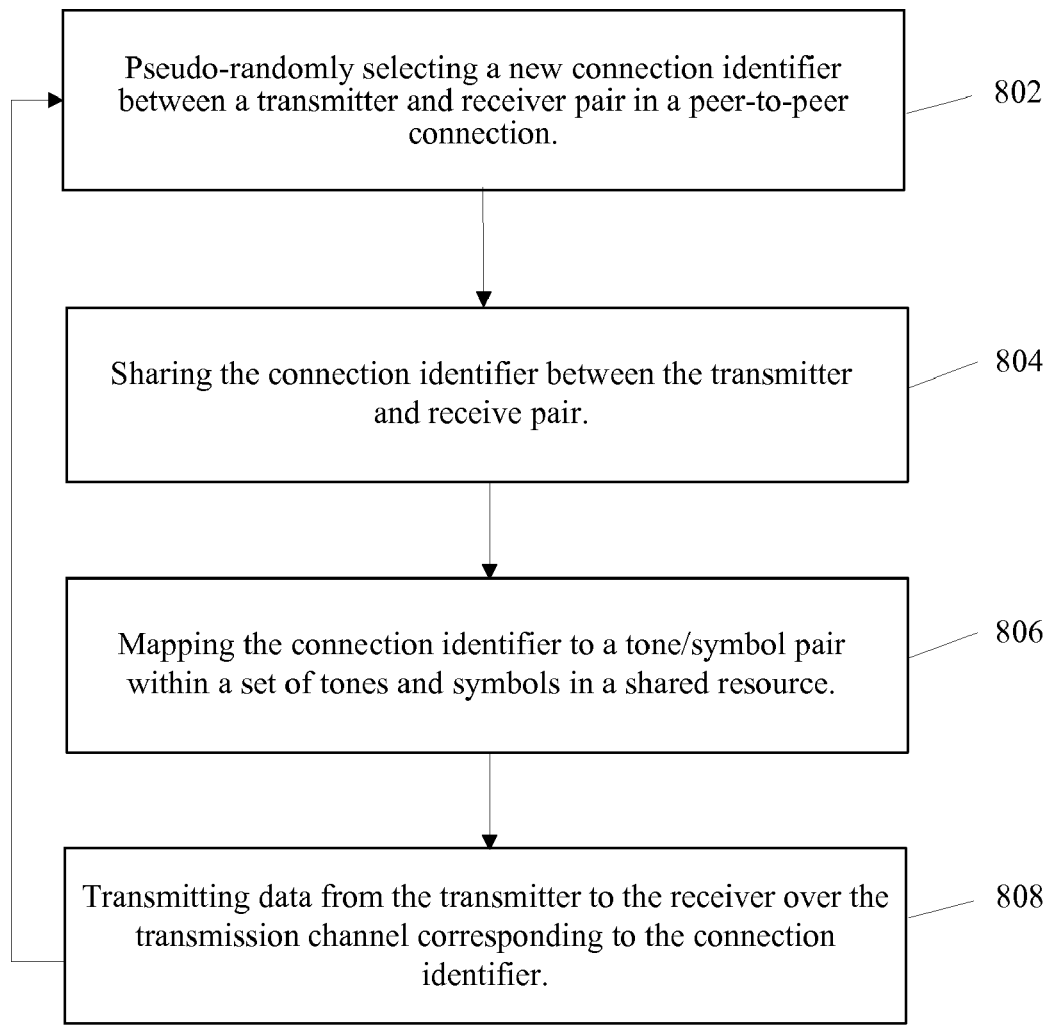
FIG. 8 illustrates a method for performing collision mitigation in a peer-to-peer network using randomly or pseudo-randomly selected transmission identifiers.

FIG. 8 illustrates a method for performing collision mitigation in a peer-to-peer network using randomly or pseudo-randomly selected transmission identifiers. A pseudo-random transmission identifier may be selected between a transmitter/receiver pair (e.g., first and second terminals) in a peer-to-peer connection 802. The transmission identifier is shared between the transmitter and receiver pair 804. For example, the transmission identifier may be selected by a transmitter terminal and provided or sent to the receiver terminal. In other implementations, the transmitter and receiver terminals may jointly derive and/or contribute to the derivation of the transmission identifier. The transmission identifier may correspond to or is mapped to a tone/symbol pair within a set of tones and symbols in a shared resource 806. Consequently, the transmission identifier may correspond or can be mapped to a particular communication channel (e.g., frequency-time and/or tone-symbol) in a shared frequency spectrum. Subsequently, the transmitter may transmit to the receiver over the transmission channel corresponding to the transmission identifier 808.

Figure 9A:
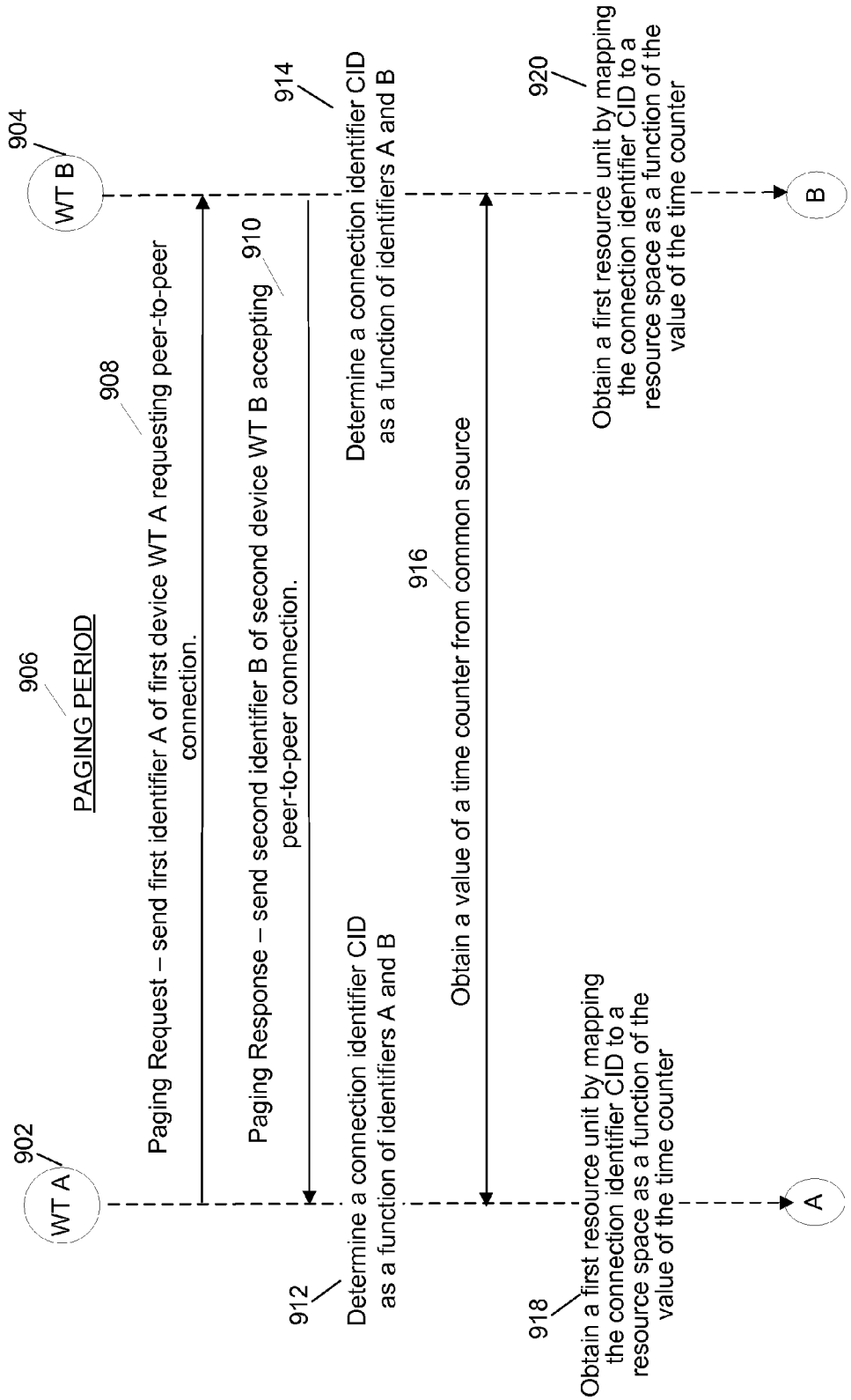
FIG. 9 (comprising FIGS. 9A and 9B) is a flow diagram illustrating how a first device and a second device may establish and use a connection identifier for a peer-to-peer communication connection in a wireless communications network.
Figure 9B:
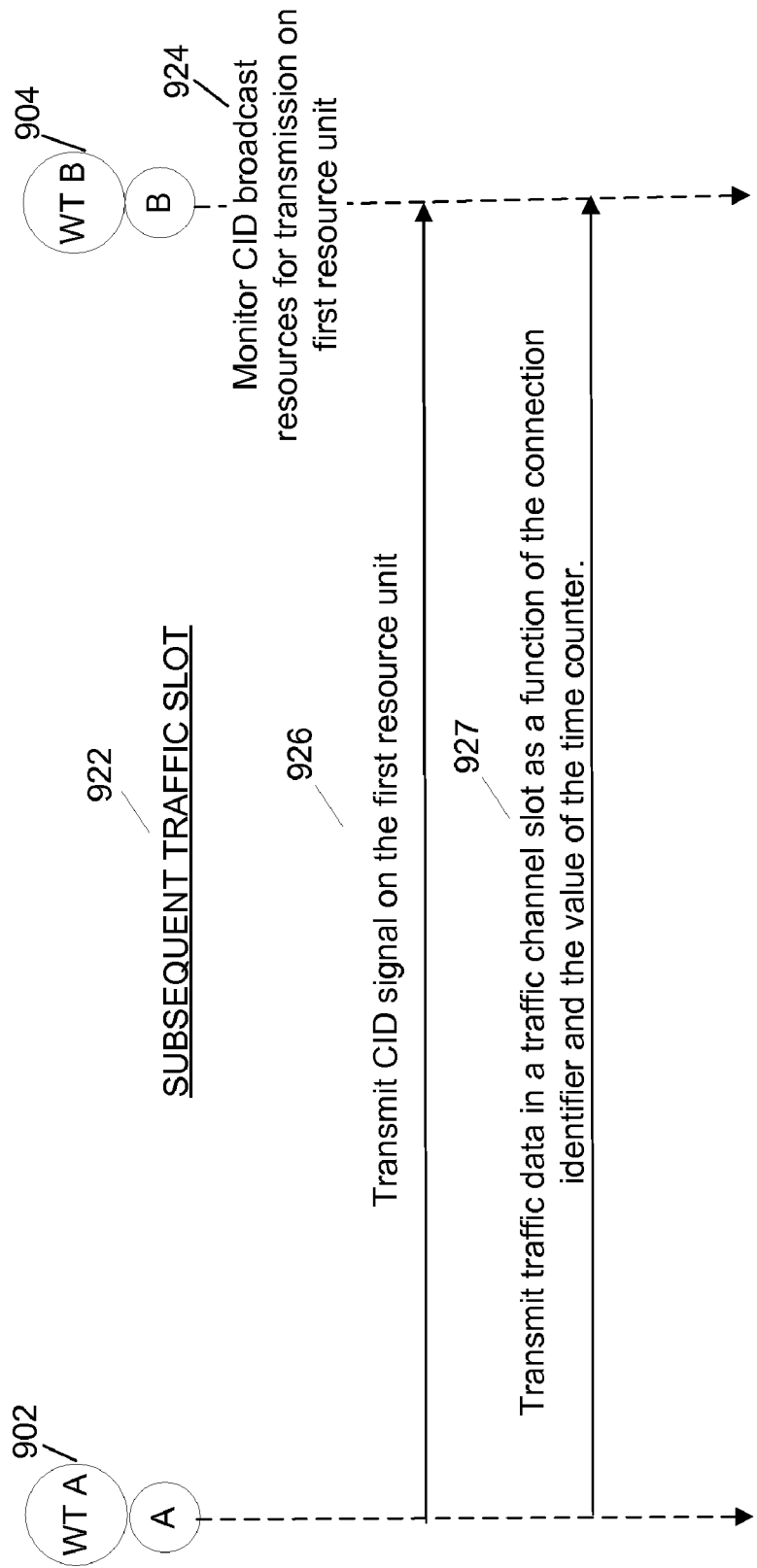

FIG. 9 (comprising FIGS. 9A and 9B) is a flow diagram illustrating how a first device and a second device may establish and use a connection identifier for a peer-to-peer communication connection in a wireless communications network. During paging period 906 (e.g., over paging channel 408 in FIG. 4), the first device WT A 902 and second device WT B 904 may exchange device identifiers A and B. For instance, in a paging request, the first device WT A 902 may send a first identifier A of the first device WT A requesting a peer-to-peer connection 908. In a paging response, the second device WT B 904 may send a second identifier B of the second device WT B accepting the peer-to-peer connection 910.

The first device WT A 902 and second device WT B 904 then determine the connection identifier CID as a function of the first device identifier A and the second device identifier B 912 and 914. The devices WT A 902 and WT B 904 also obtain a value of a time counter 916. For instance, a broadcast signal from a common network timing source (e.g., a WAN network beacon) may be available to both the first and second devices 902 and 904 and can be used to determine the value of the time counter. A first resource unit (i.e., a particular tone/symbol combination within a CID resource space) is then obtained by mapping the connection identifier (CID) to a resource space (e.g., within a control slot or a traffic management channel slot) as a function of the value of the time counter 918 and 920, where the resource space may represent a plurality of tones and symbols. This selected CID and/or resource unit may be used by the first and second devices for subsequent transmissions.

During a subsequent traffic slot 922 (e.g., traffic slot 210 in FIG. 2), the second device WT B may monitor CID broadcast resources (e.g., during a connection scheduling segment 202) for transmissions on the first resource unit 924. Such transmissions of the first resource unit may be used to indicate a traffic data transmission in a corresponding traffic channel (e.g., data transmission segment 206 in FIG. 2). The first device WT A may transmit a CID signal on the first resource unit 926 (e.g., during a connection scheduling segment 202) to indicate a traffic transmission to the second device WT B. That is, the first device WT A may transmit at a particular symbol and tone combination (associated with the first resource unit) to indicate an upcoming traffic transmission. The first device WT A may then transmit traffic data in a traffic slot (e.g., data transmission segment 206 in FIG. 2) as a function of the connection identifier (CID) and/or the value of the time counter 927. For example, the first device WT A may use the connection identifier (CID) and/or the value of the time counter to obtain a scrambling sequence with which to scramble the traffic data prior to transmission on the traffic slot. The second device WT B may also use the connection identifier (CID) and/or the value of the time counter to obtain a descrambling sequence with which to detect and/or descramble the traffic signal in the traffic slot.

Figure 10A:
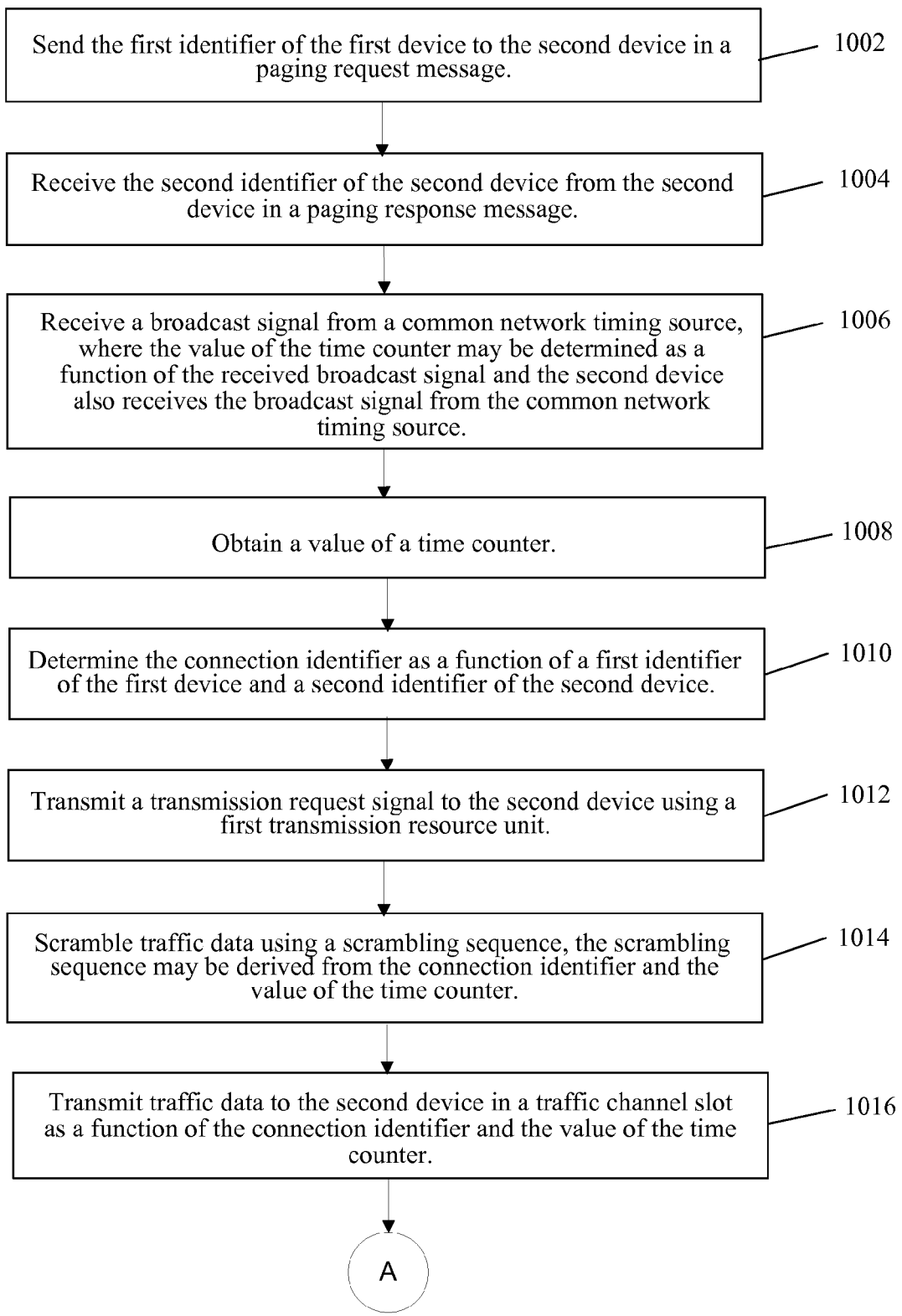
FIG. 10 (comprising FIGS. 10A and 10B) illustrates a method for generating and utilizing a connection identifier for a peer-to-peer communication connection between the first device and a second device in a wireless communications network.
Figure 10B:
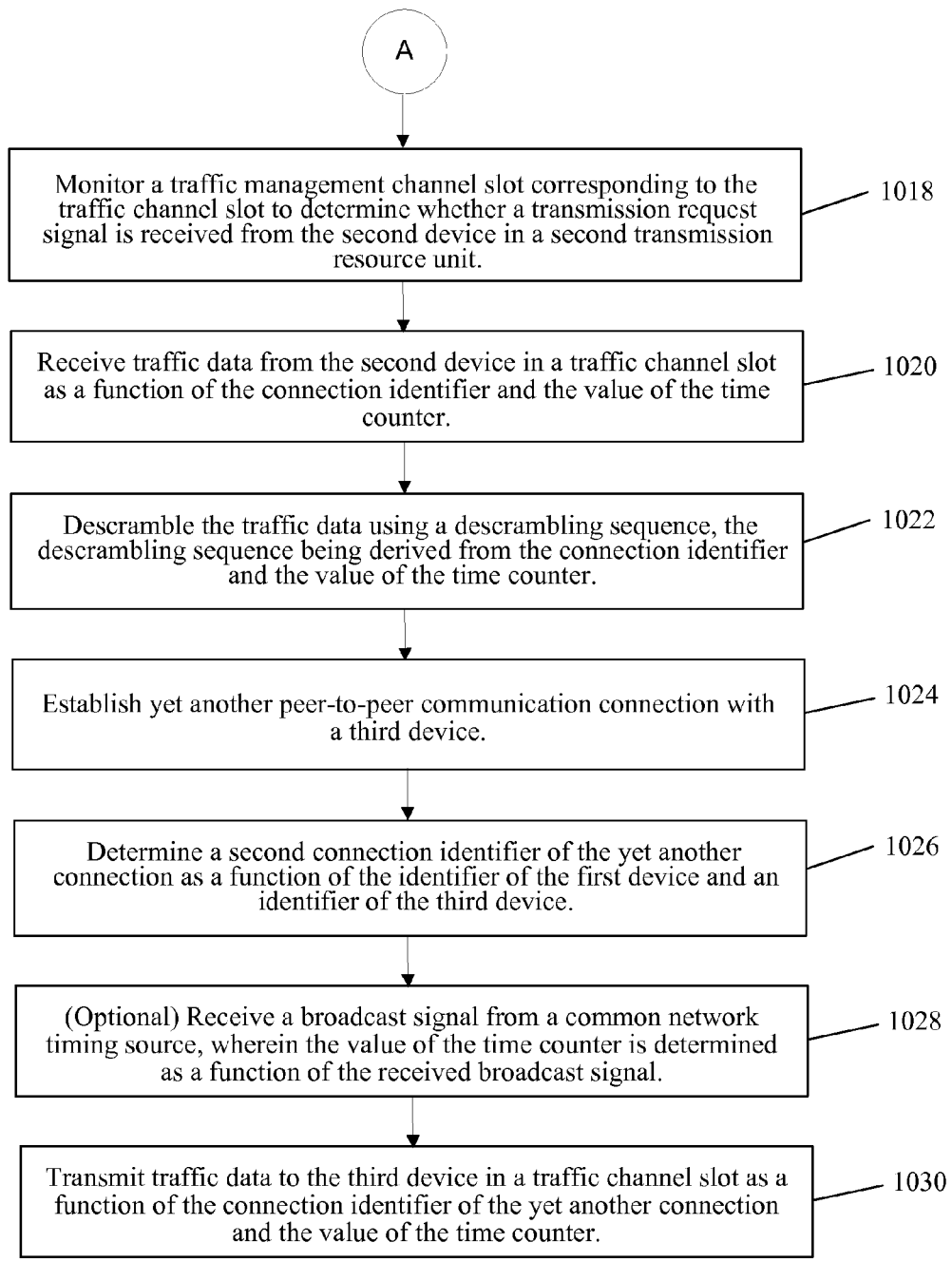

FIG. 10 (comprising FIGS. 10A and 10B) illustrates a method for generating and utilizing a connection identifier for a peer-to-peer communication connection between the first device and a second device in a wireless communications network. The first device may send a first identifier of the first device to the second device in a paging request message 1002. The first device may also receive a second identifier of the second device from the second device in a paging response message 1004. In one example, the first device may receive a broadcast signal from a common network timing source, where the value of the time counter may be determined as a function of the received broadcast signal and the second device also receives the broadcast signal from the common network timing source 1006. In an alternative example, the first device may instead maintain local counter which is also known or provided to the second device. The first device may then obtain or determine a value of a time counter 1008. The first device may then determine a connection identifier (CID) as a function of a first identifier of the first device and a second identifier of the second device 1008. Note that the connection identifier may be generated by the first device alone or in collaboration with the second device.

Prior to transmitting traffic data, the first device may transmit a transmission request signal to the second device using a first transmission resource unit 1012. The first transmission resource unit may be a subset of tones in a subset of symbols within a traffic management channel slot corresponding to the traffic channel slot and the first transmission resource unit may be determining as a function of the connection identifier (CID) and the value of the time counter. For instance, the first transmission resource unit may be a particular tone/symbol combination within a transmission CID resource (706 in FIG. 7). Consequently, because the time counter changes from one slot to another, a different tone/symbol combination within the transmission CID resource is used from one slot to another.

The first device may then transmit traffic data to the second device in a traffic channel slot as a function of the connection identifier and the value of the time counter 1016. Prior to transmitting the traffic data, the first device may scramble the traffic data using a scrambling sequence, the scrambling sequence may be derived from the connection identifier CID and the value of the time counter 1014.

The traffic management channel slot may include a plurality of OFDM symbols, each OFDM symbol including a plurality of tones, and the first transmission resource unit includes one tone in one of the plurality of symbols in the traffic management channel slot.

Control signaling and/or traffic data communications may also be transmitted from the second device to the first device. Prior to receiving traffic data, the first device may monitor a traffic management channel slot corresponding to the traffic channel slot to determine whether a transmission request signal is received from the second device in a second transmission resource unit 1018. The second transmission resource unit may be a subset of tones in a subset of symbols within a traffic management channel slot corresponding to the traffic channel slot and the transmission resource unit being determined as a function of the connection identifier and the value of the time counter. Note that the first and second transmission resource units may be defined by the same or different tone and symbol combinations within a transmission CID resource or space (706 in FIG. 7) in different time intervals.

The first device may then receive traffic data from the second device in a traffic channel slot as a function of the connection identifier and the value of the time counter 1020. Subsequent to receiving traffic data, the first device may descramble traffic data using a scrambling sequence, where the scrambling sequence may be derived from the connection identifier and the value of the time counter 1022.

Additionally, the first device may also communicate with a third device, either concurrent with the second device or in a different time interval than with the second device. The first device may establish yet another peer-to-peer communication connection with a third device 1024. The first device also determines a second connection identifier of the yet another connection as a function of the identifier of the first device and an identifier of the third device 1026. Optionally, a broadcast signal may be received by the first device from a common network timing source, where the value of the time counter is determined as a function of the received broadcast signal 1028. In some implementations, the first device may use the timer value t, obtained for the connection between the first and second terminal, for the connection between the first and third terminal. The first device may then transmit traffic data to the third device in a traffic channel slot as a function of the second connection identifier and the value of the time counter 1030.

Figure 11:
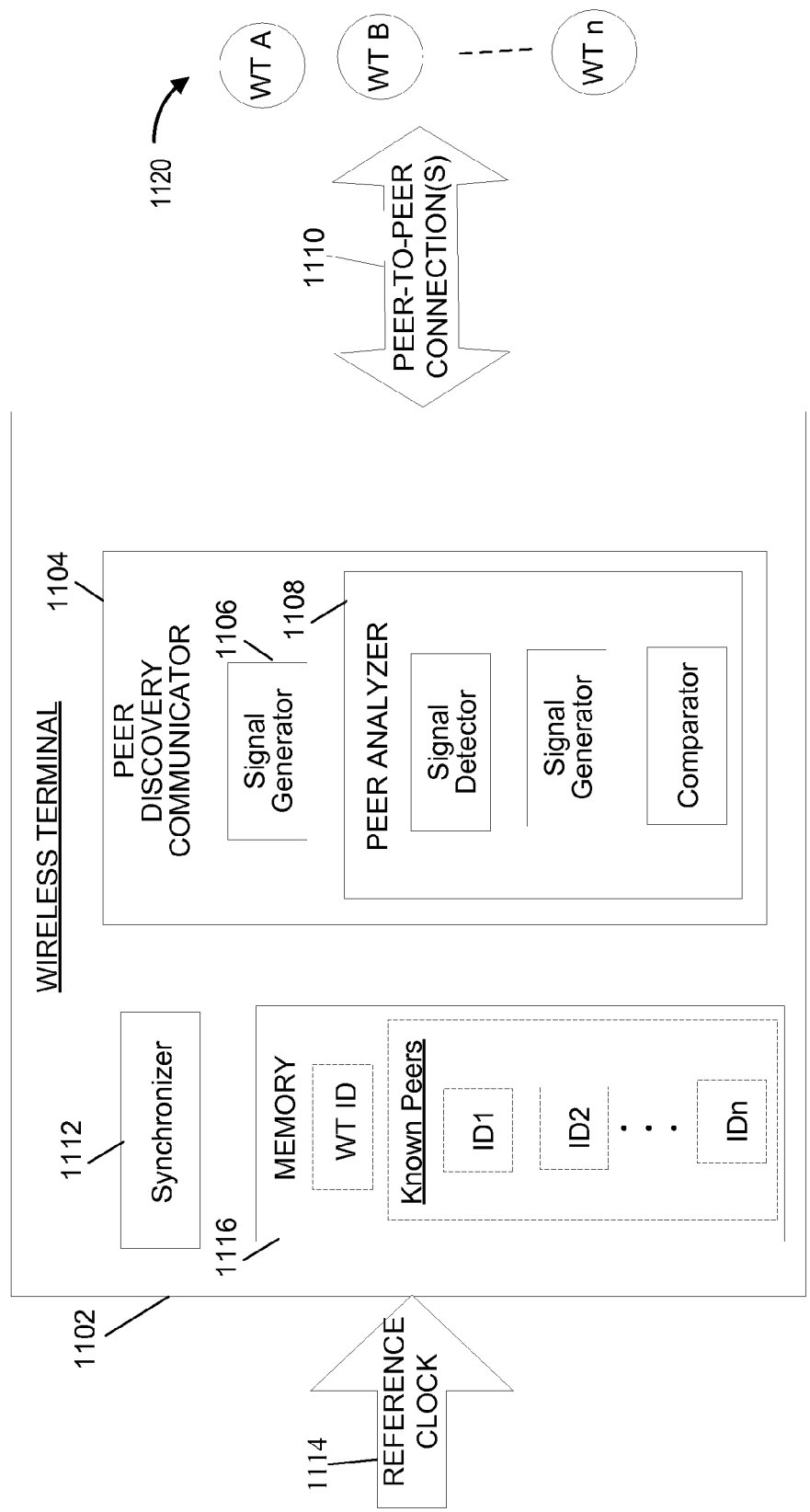
FIG. 11 is a block diagram illustrating an example of a wireless terminal that may be configured to perform pseudo-random transmission CID selection in a peer-to-peer network.

Wireless Terminal Configured to Use Pseudo-Random Transmission IDs in P2P Connection FIG. 11 is a block diagram illustrating an example of a wireless terminal that may be configured to perform non-orthogonal or pseudo-random transmission CID selection in a peer-to-peer network. The wireless terminal 1102 may communicate directly with substantially any number of disparate wireless terminals 1120 over peer-to-peer connections.

Wireless terminal 1102 may include a peer discovery communicator 1104 that may effectuate encoding, sending, receiving, evaluating, of signals associated with peer discovery during a peer discovery interval (or a plurality of peer discovery intervals). Peer discovery communicator 1104 may further comprise a signal generator 1106 and a peer analyzer 1108. The signal generator 1108 may generate and/or transmit a signal to disparate wireless terminals 1120 via wireless peer-to-peer connections 1110 and those wireless terminals may evaluate the signal to detect and identify wireless terminal 1102. Further, peer analyzer 1108 may receive signal(s) sent from disparate wireless terminal(s) 1120 and may evaluate the received signal(s) to detect and identity disparate wireless terminal(s) 1120 to which the received signal(s) correspond.

Wireless terminal 1102 may additionally include a synchronizer 1112 that conforms timing between wireless terminal 1102 and the disparate wireless terminals 1120. Synchronizer 1112 may obtain its timing from broadcast information (e.g., a common clock reference 1114) from a base station (not shown) in a vicinity of wireless terminal 1102. Similarly, synchronizers of the disparate wireless terminals 1120 may obtain their respective timing from the same broadcast information (reference clock 1114). The broadcast information may be, for example, a single-tone beacon signal, a CDMA PN (pseudo random) sequence signal, a pilot signal or other broadcast signal. Synchronizer 1112 may evaluate the obtained broadcast information to determine timing information. By way of illustration, wireless terminal 1102 and the disparate wireless terminals 1120 may receive and synchronize to the same broadcast information, and therefore, have a common understanding of time. The common notion of time may be utilized to partition a timeline into distinct intervals for differing types of functions such as, for instance, peer discovery, paging, and traffic, according to a predetermined pattern defined by an air interface protocol. Moreover, the timing information may be utilized by the signal generator 1106 to create signals for transmission during peer discovery and/or peer analyzer 1108 to evaluate received signals for peer discovery. Furthermore, the synchronizer 1112 obtains and analyzes the common clock reference 1114 to coordinate performance of various functions (e.g., peer discovery, paging, traffic) and determine a meaningful notion of time (e.g., time counter) consistent with disparate wireless terminals 1120 in the peer-to-peer network. Therefore, peers get the same timing (timing synchronized) without directly communicating with each other.

The wireless terminal 1102 may be associated with a unique identifier (WT ID). For example, wireless terminal 1102 may include memory 1116 that retains a unique identifier (WT ID) that corresponds to wireless terminal 1102. However, it is contemplated that wireless terminal 1102 may derive, obtain, etc., its unique identifier (WT ID) from any location (e.g., local and/or remote to wireless terminal 1102). Additionally, memory 1116 may retain any additional type of data and/or instructions related to wireless terminal 1102. Moreover, wireless terminal 1102 may include a processor (not shown) that executes instructions described herein.

Signal generator 1106 may create and/or transmit a signal to the disparate wireless terminals 1120. Signal generator 1106 may encode and/or send a signal in a peer discovery interval as a function of the unique identifier (WT ID) of wireless terminal 1102. In accordance with an example, the signal yielded by signal generator 1106 may be a single-tone beacon signal, which may provide power efficiency. Thus, signal generator 1106 may effectuate transmitting a particular tone on a selected OFDM symbol within a peer discovery interval. It is contemplated that more than one beacon signal may be transmitted (e.g., in a plurality of OFDM symbols). For example, where the transmitted signal is a beacon signal, a selected symbol time position (e.g., within the peer discovery interval) and/or a tone position may be derived by a hash function of the unique identifier of wireless terminal 1102 (WT ID) and a time variable (e.g., timing information obtained by synchronizer 1112, time counter) identifying a current peer discovery interval. Further, wireless terminal 1102 and disparate wireless terminals 1120 may have a common value of the time variable (e.g., due to synchronization achieved by listening to an infrastructure communication channel available in a geographic area).

Pursuant to another example, the identifier associated with wireless terminal 1102 (WT ID) may be broadcast to peer(s) by signal generator 1106 (and/or peer discovery communicator 1104). Peer(s) obtaining the signal may detect and/or identify wireless terminal 1102. For example, the signal yielded by signal generator 1106 may be an output of an M-bit hash function whose input is the plain-text name of wireless terminal 1102 (e.g., WT ID) and a current counter value supplied by a base station broadcast signal (e.g., common clock reference). The counter value, for instance, may be constant during a current peer discovery interval and may be decodable by all peers. The counter value may vary (e.g., increment in a modulo sense) from one peer discovery interval to another. Further, the hash function may be specified a priori by a protocol and known to the peers.

By way of example, wireless terminal 1102 may be located in a peer-to-peer network that includes disparate wireless terminal WT A, WT B and WT n 1120. Synchronizer 1112 may determine timing associated with peer-to-peer communications (e.g., based upon a received common clock reference). Further, at a time partitioned for peer discovery, signal generator 1106 may broadcast a signal (e.g., generated based upon an identifier (ID) of the originating wireless terminal 1102 and/or a current time) to disparate wireless terminals within range (e.g., disparate wireless terminals 1120). The signal may be received and utilized by disparate wireless terminals 1120 to detect wireless terminal 1102 and/or determine an identity of wireless terminal 1102. Moreover, peer analyzer 1108 may obtain broadcast signals from disparate wireless terminals 1120. Peer analyzer 1108 may evaluate the obtained signals to detect disparate wireless terminals 1120 and/or identify disparate wireless terminals 1120.

Peer discovery effectuated by peer discovery communicator 1104 may be passive. Further, peer discovery may be symmetric; thus, wireless terminal 202 may detect and identify disparate wireless terminals WT A, WT B, and WT n 1120, and these disparate wireless terminals 1120 may detect and identify wireless terminal 1102. However, it is contemplated that a first wireless terminal may detect and identify a second wireless terminal, but the second wireless terminal may fail to detect and identify the first wireless terminal. Additionally, upon detection and identification, further communication (e.g., paging, traffic) between wireless terminal 1102 and disparate wireless terminal(s) 1120 may, but need not, be effectuated.

Peer analyzer 1102 may maintain a list of disparate wireless terminals 1120 that are detected to be present in the current time. The list may include all disparate wireless terminals 1120 or may include those in a predefined buddy list of wireless terminal 1102 or the user who is using wireless terminal 1102. As the time goes by, the list evolves, because some disparate wireless terminals 1120 may disappear (e.g., because the corresponding users move away), or because other disparate wireless terminals 1120 may appear (e.g., because the corresponding users move close). Peer analyzer 1108 may add the new disparate wireless terminals 1120 to the list or delete disappearing disparate wireless terminals 1120 from the list. In one embodiment, peer analyzer 1108 passively maintains the list. In this case, a first peer may detect the presence of a second peer and keep the second peer in its list without informing the second peer. As a result, the second peer may not know that the first peer has already kept the second peer in the list. By symmetry, depending on wireless channel and interference condition, the second peer may also detect the presence of the first peer and keep the first peer in its list without informing the first peer. In another embodiment, after the first peer detects the presence of the second peer, the first peer proactively sends a signal to inform the second peer so that the second peer now knows that the first peer has already kept the second peer in the list, even though the first peer has no data traffic to communicate with the second peer yet. The first peer may selectively decide whether it sends a signal. For example, the first peer may send a signal only to another peer that is in the predefined buddy list.

Additionally, the wireless terminal 1102 and components therein may be configured to perform one or more of the features illustrated in FIGS. 1-10.

Figure 12:
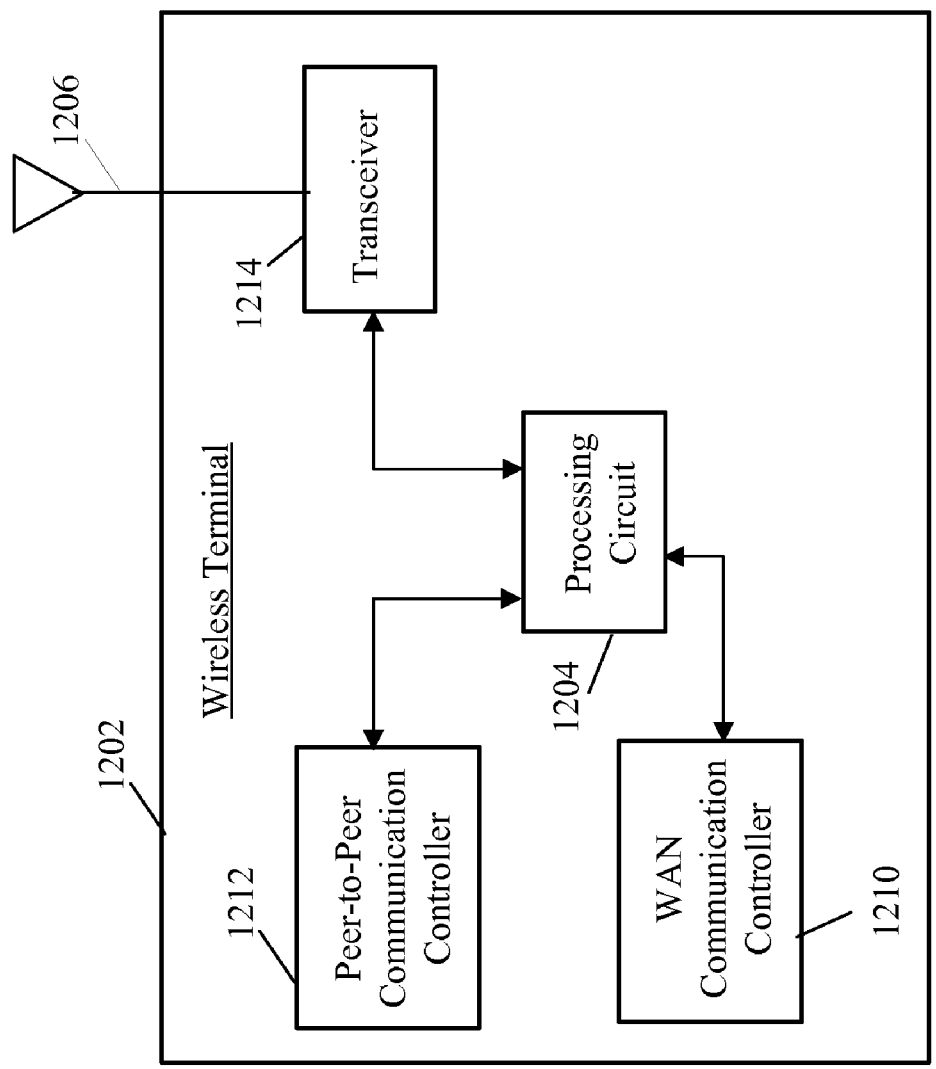
FIG. 12 is a block diagram of another embodiment of a wireless terminal that may be configured to perform pseudo-random transmission CID selection in a peer-to-peer network.

FIG. 12 is a block diagram of another embodiment of a wireless terminal that may be configured to perform non-orthogonal or pseudo-random transmission CID selection in a peer-to-peer network. The wireless terminal 1202 may include a processing circuit (e.g., one or more circuits or processors), a peer-to-peer communication controller 1212, a wide area network (WAN) controller 1210 and a transceiver 1214 coupled to an antenna 1206. The transceiver 1214 may include a (wireless) transmitter and a (wireless) receiver. The wireless terminal 1202 may communicate via a managed network infrastructure using the WAN communication controller 1210 and/or it may communicate over a peer-to-peer network using the peer-to-peer communication controller 1212. When performing peer-to-peer communications, the wireless terminal 1202 may be configured to perform one or more of the features illustrated in FIGS. 1-10.

It will be appreciated that, in accordance with one or more aspects described herein, inferences can be made regarding discovering and identifying peers in a peer-to-peer environment. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences pertaining to identifying sources of peer discovery signals in a peer-to-peer network. In accordance with another example, an inference may be made related to estimating a probability of a peer being located within proximity based upon a number of detected signals that match an expected signal format and/or energy levels associated with detected signals. It will be appreciated that the foregoing examples are illustrative in nature and are not intended to limit the number of inferences that can be made or the manner in which such inferences are made in conjunction with the various embodiments and/or methods described herein.

One or more of the components, steps, and/or functions illustrated in FIGS. 1, 2, 3, 4, 5, 6, 7, 8, 9, 10, 11 and/or 12 may be rearranged and/or combined into a single component, step, or function or embodied in several components, steps, or functions. Additional elements, components, steps, and/or functions may also be added. The apparatus, devices, and/or components illustrated in FIGS. 1, 3, 11 and/or 12 may be configured or adapted to perform one or more of the methods, features, or steps described in FIGS. 2, and/or 4-10. The algorithms described herein may be efficiently implemented in software and/or embedded hardware.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a wireless terminal. A wireless terminal can also be called a system, subscriber unit, subscriber station, mobile station, mobile, mobile device, remote station, remote terminal, access terminal, user terminal, terminal, wireless communication device, user agent, user device, or user equipment (UE). A wireless terminal may be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem.

In the following description, specific details are given to provide a thorough understanding of the configurations. However, it will be understood by one of ordinary skill in the art that the configurations may be practiced without these specific detail. For example, circuits may be shown in block diagrams in order not to obscure the configurations in unnecessary detail. In other instances, well-known circuits, structures and techniques may be shown in detail in order not to obscure the configurations.

Also, it is noted that the configurations may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

In one or more examples and/or configurations, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above are also be included within the scope of computer-readable media.

Moreover, a storage medium may represent one or more devices for storing data, including read-only memory (ROM), random access memory (RAM), magnetic disk storage mediums, optical storage mediums, flash memory devices and/or other machine readable mediums for storing information.

Furthermore, configurations may be implemented by hardware, software, firmware, middleware, microcode, or any combination thereof. When implemented in software, firmware, middleware or microcode, the program code or code segments to perform the necessary tasks may be stored in a computer-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Those of skill in the art would further appreciate that the various illustrative logical blocks, modules, circuits, and algorithm steps described in connection with the configurations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features described herein can be implemented in different systems. For example, the secondary microphone cover detector may be implemented in a single circuit or module, on separate circuits or modules, executed by one or more processors, executed by computer-readable instructions incorporated in a machine-readable or computer-readable medium, and/or embodied in a handheld device, mobile computer, and/or mobile phone.

It should be noted that the foregoing configurations are merely examples and are not to be construed as limiting the claims. The description of the configurations is intended to be illustrative, and not to limit the scope of the claims. As such, the present teachings can be readily applied to other types of apparatuses and many alternatives, modifications, and variations will be apparent to those skilled in the art.

What is claimed is:

1. A method of operating a first device for generating and utilizing a connection identifier for a peer-to-peer communication connection between the first device and a second device in a wireless communications network, comprising:
    determining the connection identifier as a function of a first identifier of the first device and a second identifier of the second device, wherein the connection identifier indicates a resource for communicating traffic data between the first device and the second device;
    obtaining a value of a time counter;
    transmitting traffic data to the second device in a traffic channel slot as a function of the connection identifier and the value of the time counter; and
    receiving a broadcast signal from a common network timing source, wherein the value of the time counter is determined as a function of the received broadcast signal and the second device receives the broadcast signal from the common network timing source.

2. The method of claim 1, further comprising:
    prior to transmitting traffic data, scrambling traffic data using a scrambling sequence, the scrambling sequence being derived from the connection identifier and the value of the time counter.

3. The method of claim 1, further comprising:
    prior to transmitting traffic data, transmitting a transmission request signal to the second device using a transmission resource unit, the transmission resource unit being a subset of tones in a subset of symbols within a traffic management channel slot corresponding to the traffic channel slot and the transmission resource unit being determined as a function of the connection identifier and the value of the time counter.

4. The method of claim 3, wherein the traffic management channel slot includes a plurality of OFDM symbols, each OFDM symbol including a plurality of tones, and the transmission resource unit includes one tone in one of the plurality of symbols in the traffic management channel slot.

5. The method of claim 1, further comprising:
    receiving traffic data from the second device in a traffic channel slot as a function of the connection identifier and the value of the time counter.

6. The method of claim 5, further comprising:
    subsequent to receiving traffic data, descrambling traffic data using a descrambling sequence, the descrambling sequence being derived from the connection identifier and the value of the time counter.

7. The method of claim 5, further comprising:
    prior to receiving traffic data, monitoring a traffic management channel slot corresponding to the traffic channel slot to determine whether a transmission request signal is received from the second device in a transmission resource unit, the transmission resource unit being a subset of tones in a subset of symbols within a traffic management channel slot corresponding to the traffic channel slot and the transmission resource unit being determined as a function of the connection identifier and the value of the time counter.

8. The method of claim 1, further comprising:
establishing yet another peer-to-peer communication connection with a third device;
determining a second connection identifier of the yet another connection as a function of the first identifier of the first device and a third identifier of the third device;
receiving a broadcast signal from a common network timing source, wherein the value of the time counter is determined as a function of the received broadcast signal; and
transmitting traffic data to the third device in a traffic channel slot as a function of the second connection identifier and the value of the time counter.

9. The method of claim 1, further comprising:
prior to determining the connection identifier, sending the first identifier of the first device to the second device in a paging request message; and
receiving the second identifier of the second device from the second device in a paging response message.

10. A first device configured to generate and utilize a connection identifier for a peer-to-peer communication connection between the first device and a second device in a wireless communications network, comprising:
a transmitter and receiver for establishing the wireless peer-to-peer communication connection; and
a processing circuit adapted to perform peer to peer communications through the transmitter and receiver over a peer-to-peer communication channel, the processing circuit configured to:
determine the connection identifier as a function of a first identifier of the first device and a second identifier of the second device, wherein the connection identifier indicates a resource for communicating traffic data between the first device and the second device;
obtain a value of a time counter; and
transmit traffic data to the second device in a traffic channel slot as a function of the connection identifier and the value of the time counter, wherein the processing circuit is further adapted to receive a broadcast signal from a common network timing source, and the value of the time counter is determined as a function of the received broadcast signal and the second device receives the broadcast signal from the common network timing source.

11. The first device of claim 10, wherein the processing circuit is further adapted to:
scramble the traffic data using a scrambling sequence, the scrambling sequence being derived from the connection identifier and the value of the time counter.

12. The first device of claim 10, wherein the processing circuit is further adapted to:
transmit a transmission request signal to the second device using a transmission resource unit, the transmission resource unit being a subset of tones in a subset of symbols within a traffic management channel slot corresponding to the traffic channel slot and the transmission resource unit being determined as a function of the connection identifier and the value of the time counter.

13. The first device of claim 12, wherein the traffic management channel slot includes a plurality of OFDM symbols, each OFDM symbol including a plurality of tones, and the transmission resource unit includes one tone in one of the plurality of symbols in the traffic management channel slot.

14. The first device of claim 10, wherein the processing circuit is further adapted to:
receive traffic data from the second device in a traffic channel slot as a function of the connection identifier and the value of the time counter.

15. The first device of claim 14, wherein the processing circuit is further adapted to:
descramble traffic data using a descrambling sequence, the descrambling sequence being derived from the connection identifier and the value of the time counter.

16. The first device of claim 14, wherein the processing circuit is further adapted to:
monitor a traffic management channel slot corresponding to the traffic channel slot to determine whether a transmission request signal is received from the second device in a transmission resource unit, the transmission resource unit being a subset of tones in a subset of symbols within a traffic management channel slot corresponding to the traffic channel slot and the transmission resource unit being determined as a function of the connection identifier and the value of the time counter.

17. A first device configured to generate and utilize a connection identifier for a peer-to-peer communication connection between the first device and a second device in a wireless communications network, comprising:
means for determining the connection identifier as a function of a first identifier of the first device and a second identifier of the second device, wherein the connection identifier indicates a resource for communicating traffic data between the first device and the second device;
means for obtaining a value of a time counter;
means for transmitting traffic data to the second device in a traffic channel slot as a function of the connection identifier and the value of the time counter; and
means for receiving a broadcast signal from a common network timing source, wherein the value of the time counter is determined as a function of the received broadcast signal and the second device receives the broadcast signal from the common network timing source.

18. The first device of claim 17, further comprising:
means for scrambling the traffic data using a scrambling sequence, the scrambling sequence being derived from the connection identifier and the value of the time counter.

19. The first device of claim 17, further comprising:
means for transmitting a transmission request signal to the second device using a transmission resource unit, the transmission resource unit being a subset of tones in a subset of symbols within a traffic management channel slot corresponding to the traffic channel slot and the transmission resource unit being determined as a function of the connection identifier and the value of the time counter.

20. The first device of claim 19,
wherein the traffic management channel slot includes a plurality of OFDM symbols, each OFDM symbol including a plurality of tones, and the transmission resource unit includes one tone in one of the plurality of symbols in the traffic management channel slot.

21. The first device of claim 17, further comprising:
means for receiving traffic data from the second device in a traffic channel slot as a function of the connection identifier and the value of the time counter.

22. The first device of claim 21, further comprising:
means for descrambling traffic data using a descrambling sequence, the descrambling sequence being derived from the connection identifier and the value of the time counter.

23. The first device of claim 22, further comprising:
means for monitoring a traffic management channel slot corresponding to the traffic channel slot to determine whether a transmission request signal is received from the second device in a transmission resource unit, the transmission resource unit being a subset of tones in a subset of symbols within the traffic management channel slot corresponding to the traffic channel slot and the transmission resource unit being determined as a function of the connection identifier and the value of the time counter.

24. The first device of claim 17, further comprising:
means for sending the first identifier of the first device to the second device in a paging request message; and
means for receiving the second identifier of the second device from the second device in a paging response message.

25. A circuit for generating and utilizing a connection identifier for a peer-to-peer communication connection between a first device and a second device in a wireless communications network, wherein the circuit operates in the first device and is adapted to:
determine the connection identifier as a function of a first identifier of the first device and a second identifier of the second device, wherein the connection identifier indicates a resource for communicating traffic data between the first device and the second device;
obtain a value of a time counter;
transmit traffic data to the second device in a traffic channel slot as a function of the connection identifier and the value of the time counter; and
receive a broadcast signal from a common network timing source, wherein the value of the time counter is determined as a function of the received broadcast signal and the second device receives the broadcast signal from the common network timing source.

26. The circuit of claim 25, wherein the circuit is further adapted to:
scramble the traffic data using a scrambling sequence, the scrambling sequence being derived from the connection identifier and the value of the time counter.

27. The circuit of claim 25, wherein the circuit is further adapted to:
transmit a transmission request signal to the second device using a transmission resource unit, the transmission resource unit being a subset of tones in a subset of symbols within a traffic management channel slot corresponding to the traffic channel slot and the transmission resource unit being determined as a function of the connection identifier and the value of the time counter.

28. The circuit of claim 27, wherein the traffic management channel slot includes a plurality of OFDM symbols, each OFDM symbol including a plurality of tones, and the transmission resource unit includes one tone in one of the plurality of symbols in the traffic management channel slot.

29. The circuit of claim 28, wherein the circuit is further adapted to:
receive traffic data from the second device in a traffic channel slot as a function of the connection identifier and the value of the time counter.

30. The circuit of claim 29, wherein the circuit is further adapted to:
descramble traffic data using a scrambling sequence, the scrambling sequence being derived from the connection identifier and the value of the time counter.

31. A non-transitory machine-readable medium comprising instructions for a first device to generate and utilize a connection identifier for a peer-to-peer communication connection between the first device and a second device in a wireless communications network, which when executed by a processor causes the processor to:
determine the connection identifier as a function of a first identifier of the first device and a second identifier of the second device, wherein the connection identifier indicates a resource for communicating traffic data between the first device and the second device;
obtain a value of a time counter; and
transmit traffic data to the second device in a traffic channel slot as a function of the connection identifier and the value of the time counter; and
receive a broadcast signal from a common network timing source, wherein the value of the time counter is determined as a function of the received broadcast signal and the second device receives the broadcast signal from the common network timing source.

32. The machine-readable medium of claim 31, further comprising instructions to:
scramble the traffic data using a scrambling sequence, the scrambling sequence being derived from the connection identifier and the value of the time counter.

33. The machine-readable medium of claim 31, further comprising instructions to:
transmit a transmission request signal to the second device using a transmission resource unit, the transmission resource unit being a subset of tones in a subset of symbols within a traffic management channel slot corresponding to the traffic channel slot and the transmission resource unit being determined as a function of the connection identifier and the value of the time counter.

34. The machine-readable medium of claim 33, wherein the traffic management channel slot includes a plurality of OFDM symbols, each OFDM symbol including a plurality of tones, and the transmission resource unit includes one tone in one of the plurality of symbols in the traffic management channel slot.

35. The machine-readable medium of claim 31, further comprising instructions to:
receive traffic data from the second device in a traffic channel slot as a function of the connection identifier and the value of the time counter; and
descramble traffic data using a scrambling sequence, the scrambling sequence being derived from the connection identifier and the value of the time counter.

* * * * *